United States Patent [19]

Webb

[11] Patent Number: 5,297,896

[45] Date of Patent: * Mar. 29, 1994

[54] ENVIRONMENTALLY SAFE UNDERGROUND PIPING SYSTEM

[75] Inventor: Michael C. Webb, Chester Springs, Pa.

[73] Assignee: Environ Products, Inc., Lionville, Pa.

[*] Notice: The portion of the term of this patent subsequent to Nov. 23, 2010 has been disclaimed.

[21] Appl. No.: 857,361

[22] Filed: Mar. 25, 1992

Related U.S. Application Data

[63] Continuation-in-part of Ser. No. 838,615, Feb. 19, 1992.

[51] Int. Cl.5 ............................................. F16L 1/00
[52] U.S. Cl. ........................................ 405/52; 405/128; 405/258; 588/249
[58] Field of Search ................... 405/52, 53, 128, 129, 405/258; 588/249

[56] References Cited

U.S. PATENT DOCUMENTS

| | | |
|---|---|---|
| 4,659,251 | 4/1987 | Petter et al. ........................ 405/52 |
| 4,932,257 | 6/1990 | Webb . |
| 4,958,957 | 9/1990 | Berg et al. ...................... 405/52 X |
| 4,968,179 | 11/1990 | Frahm ............................ 405/128 X |
| 4,971,477 | 11/1990 | Webb et al. . |
| 5,030,033 | 7/1991 | Heintzelman et al. ........... 405/53 X |
| 5,098,221 | 3/1992 | Osborne ............................... 405/52 |

Primary Examiner—Dennis L. Taylor
Attorney, Agent, or Firm—Eugene E. Renz, Jr.

[57] ABSTRACT

An environmentally safe underground piping system for liquid fuels and chemicals which interconnects an underground liquid storage tank to one or more above ground liquid dispensing units, that provides a complete secondary containment system for the entire primary liquid supply piping system. The piping systems employs one tank access chamber interconnected to one or more dispenser access chambers by a double walled pipe. The double wall pipe provides an interstitial space for gravity flow of any leaking liquids, from any point in the primary liquid supply piping system, to an access chamber, which also serves as a liquid collection sump, for purposes of leak detection.

32 Claims, 13 Drawing Sheets

ENVIRONMENTALLY SAFE UNDERGROUND PIPING SYSTEM

CROSS REFERENCE TO RELATED APPLICATIONS

This application is a continuation-in-part of copending application Ser. No. 07/838,615, filed on Feb. 19, 1992, the entire disclosure of which is incorporated by reference herein.

FIELD OF THE INVENTION

The present invention relates to an environmentally safe underground piping system which is secondarily contained to prevent hazardous fluids from escaping into the surrounding environment.

BACKGROUND OF THE INVENTION

In recent years there has been an increased awareness that the underground storage and distribution systems of hazardous fluids, such as, hydrocarbon fuels and a diversity of chemicals, need to be improved to prevent any leaking product from these systems from escaping into the environment and potentially contaminating the underground drinking water. Both public health and fire safety regulatory bodies have imposed strict guidelines and regulations on such systems to insure public safety.

Leaking underground storage tanks and their associated underground piping systems became the focus of the Federal Environmental Protection Agency (EPA) to initiate federal and state legislation that would require an improved means of storage, distribution, leak detection and accounting of all stored fluids which are deemed to be hazardous. The EPA conducted studies which showed that underground piping failures were caused by poor installation practices, corrosion and structural failure were responsible for most of the leaks reported.

In response to this public awareness and concern, equipment specifiers and manufacturers have developed improved piping systems in recent years to provide a greater degree of protection for the environment. Most of these improved piping systems provide a second barrier of protection around the primary fluid supply piping, commonly referred to as "secondary containment".

In addition to the regulatory bodies mentioned above, facility owners and their insurance companies have become very concerned with the type of materials used and the design specifications of existing, new and proposed fuel storage, transmission and dispensing equipment. An important area of concern is the chemical compatibility of the materials used in the construction of both the primary and secondary containment systems. As a result, Underwriters Laboratories Inc. (UL), a nationally recognized and accepted independent testing laboratory, has already established and proposed new standards for both the primary and secondary containment underground storage, transmission and dispensing equipment. Acceptable materials for use in this application generally relate to the materials stability when exposed to conditions and chemicals found naturally in a subterranean environment and the exposure to the fuels and their chemical additives, as well as other chemicals being stored and dispensed. In addition, another area of concern is ability of a material to provide an acceptable containment barrier for the product to be stored. The product permeability rating of a material is generally accepted by regulators and UL as being more stringent for the primary storage vessel than the secondary containment vessel, which only provides a means of temporary storage of leaking product until detected and corrected.

For example, UL has established and proposed new standards which include acceptable permeability levels for the primary containment and secondary containment storage and dispensing systems. These standards require that a typical primary wall section should not be able to permeate more than 1% of its stored product weight over a period of 270 days, whereas, a typical secondary containment wall section should not be able to permeate more than 1% of its stored product over a period of 30 days. Keeping these standards in mind, UL listed products for storage of hazardous liquids and fuels must be constructed of the proper materials at the acceptable thickness to provide a satisfactory level of environmental protection and fire safety.

For purpose of this description, "underground piping systems" is defined as the means of transferring hazardous liquids from a buried underground storage "tank", by the tanks electrically powered dispensing "pump" to a generally metered dispensing unit or "dispenser", generally located above ground. An underground piping system which is secondarily contained by a larger diameter piping system is generally referred to as a "double-wall piping system". The primary distribution pipe which is contained is commonly referred to as the "supply pipe" and the larger outer secondary containment pipe is commonly referred to as the "containment pipe". Other secondary containment components, such as, surface access chambers, which are installed around the tanks pump and underneath a dispenser, are commonly referred to as "access sumps". These storage, transferring and dispensing systems, are typically found at service stations which market gasoline and diesel fuel.

Equipment manufacturers have in recent years introduced both patented and non-patented supply piping systems and/or secondary containment systems for these supply piping systems of various designs and material selections. The following double wall piping systems which are considered to be prior art of this invention, are disclosed as follows:

(1). A secondarily contained underground piping system which features a non-flexible fiberglass supply pipe system fully contained by a larger non-flexible fiberglass containment piping system. One such system also includes the feature of telescoping containment pipe, whereby two non-flexible containment pipes are offered, one with a slightly larger inside diameter than the outside diameter than the other. This permits larger pipe to be installed over the smaller pipe therefore exposing more of the supply pipe contained within both. The containment pipe and fittings are of a larger inside diameter than the outside diameter of the supply pipe and fittings contained within. The short bend radius containment fittings and couplings are of a clamshell design (two piece) to permit assembly of the the short bend radius supply fittings prior to assembly of the containment piping system. Both the supply and containment piping components are joined together by heat activated resins to insure a liquid tight joint. These systems are generally difficult to install due to the nature of their design and joining system. Both the supply and containment piping system are made of fiberglass which provides excellent chemical compatibility and impermeability.

(2). A secondarily contained underground piping system which features a non-flexible fiberglass or steel supply pipe fully contained by a combination of both a larger flexible and non-flexible polyethylene telescoping containment pipe. The telescoping containment pipe design that permits the complete inspection of the supply pipe line during assembly and integrity testing. This containment piping system includes a flexible containment pipe which is sufficiently flexible to go around and contain short bend radius supply elbow fittings. An oversized short bend radius containment tee fitting is provided for insertion, assembly and inspection of the smaller short bend radius supply tee fittings before the containment system is assembled. The containment components of this system are joined by means of metal fasteners and flexible seals. The flexible polyethylene containment pipe is not of sufficient wall thickness and density to offer the level of impermeability necessary to meet the UL standard. The non-flexible polyethylene containment pipe is of sufficient wall thickness and density to meet the UL standard. Both the contained fiberglass or steel supply pipe will meet the UL standard. Note: The metal fastener use to make a compression will not meet the UL standard for corrosion resistance.

(3). A secondarily contained underground piping system which features a non-flexible fiberglass or steel supply pipe fully contained by a larger non-flexible polyethylene telescoping containment pipe. The telescoping containment pipe design permits the complete inspection of the supply pipe line during assembly and integrity testing. This containment piping system includes short bend radius clamshell (split) containment fittings that permits assembly and inspection of the smaller short bend radius supply fittings before the clamshell containment are assembled over them. The containment components of these systems are generally joined by means of metal fasteners and flexible seals. Both the non-flexible polyethylene containment pipe and contained fiberglass or steel pipe will meet the UL standard.

(4). A secondarily contained underground piping system which features a fiberglass or steel non-flexible supply pipe partially contained by a flexible membrane piping trench liner. This type of secondary containment system provides a single containment system for a multitude of supply pipe lines contained within. These piping trench lining systems are generally custom fabricated at the jobsite and are typically joined by mechanical means using metal fasteners and flexible seals. These piping containment systems are often difficult to install, damage prone, directionally limiting and do not provide a full measure of secondary containment. The material composition of these liners do not offer sufficient wall thickness or density to meet the UL standards. Note: The metal fastener use to make a compression will not meet the UL standard for corrosion resistance.

(5). A secondarily contained underground piping system which features a fiberglass or steel non-flexible supply pipe partially contained by a non-flexible fiberglass trench liner. This type of secondary containment system provides a single containment system for a multitude of supply pipe lines contained within. These piping trench lining systems are generally factory fabricated and shipped in large sections for assembly at the jobsite and are joined by heat activated resins in combination with glass fiber reinforcement. The material composition of these liners is sufficient to meet the UL standards.

(6). A secondarily contained underground piping system which features a flexible nylon composite supply pipe fully contained by a larger flexible polyethylene containment pipe. The flexible supply pipe has internal corrugations for added flexibility and requires metallic couplings installed on each end of a pipe section for attachment to a metallic short bend radius tee or elbow supply fitting. The flexible containment pipe is a thin wall corrugated tube which provides added flexibility and structural strength. This type of secondarily contained piping system requires the use of access sumps which are interconnected by continuous runs of both flexible supply and containment pipe sections. These access sumps provide a means of containment for the metallic supply couplings and fittings as well as the containment pipe connections. Both the supply and containment components are joined by mechanical means using rubber gaskets and washers for seals. The material composition of the flexible supply pipe will not the UL standard for primary containment of alcohol and alcohol blended fuels. The material composition of the the flexible containment pipe is not of sufficient thickness or density to meet the UL standards for secondary containment.

(7). A secondarily contained underground piping system which features a flexible rubber composite supply pipe fully contained by a larger flexible polyurethane composite containment pipe. The flexible supply pipe is made a rubber elastomeric material for flexibility and requires metallic couplings installed on each end of a pipe section for attachment to a metallic short bend radius tee or elbow supply fitting. The flexible containment pipe is a thick wall tube which provides structural strength but limited flexibility. This type of secondarily contained piping system requires the use of access sumps which are interconnected by continuous runs of both flexible supply and containment pipe sections. These access sumps provide a means of containment for the metallic supply couplings and various adapters. Both the supply and containment components are joined by mechanical means using rubber gaskets and washers for seals. The material composition of the flexible supply pipe will not meet the UL standard for primary containment.

In addition to the secondarily contained underground piping systems, described above, a number of fiberglass and steel tank manufactures, as well as piping and specialty containment manufacturers have introduced access sumps to the market. These access sumps originated from a product called a backfill retainer which was simply a round cylinder, open at the top and bottom, which was installed around the tanks pump and under the street access manhole to keep the backfill materials away from the pump and various plumbing connections. Often a short section of corrugated metallic culvert was used for this purpose. In the early-1980's, fiberglass tank manufacturers began to offer an improved backfill retainer, called a riser and riser extension which connected to the tank and was made made of non-corrodible fiberglass material. Steel tank manufactures soon followed with there own version of a riser made of coated steel. When the industry became aware that underground tanks and piping needed to be secondarily contained, they also turned their attention to the tanks pump and miscellaneous plumbing connections. Soon thereafter, pump access chambers appeared on the market as a means of secondarily containing the tanks pump and associated plumbing connections. With the introduction of these watertight chambers it was quickly recognized that they could also be used as a fluid collection and detection sump for the attached secondarily contained piping systems described above. Because these chambers were located at the low end of a sloped secondarily contained piping line, they were a logical choice for the collection point for any leaking product which was contained inside the containment pipe. From this point on they were considered to be a multi-purpose chamber and were commonly referred to as pump access sumps.

As the full scope of secondary containment requirements began to unfold, attention was turned to the causes of product leaks from within and under the above ground dispenser such as leaking plumbing joints and spillage from required fuel filter changes. The solution seemed to be a shallow collection sump installed directly under the dispenser. The first dispenser collection sumps were shallow and were commonly referred to as dispenser pans. Soon thereafter it was recognized that a deeper dispenser pan was required to contain the entire metallic flexible connector which was installed directly under the dispenser. These deeper dispenser pans became commonly known dispenser access sumps. These dispenser sumps were not developed as an extension of the secondarily contained piping systems but rather were adapted to accommodate these piping systems.

Manufacturers of these access sumps began to offer a means of attaching and sealing various pipe and conduit entries into these access sumps. One approach was to pre-install cuffed openings at various locations in the side wall of the access sump. Manufactures of fiberglass access sumps laminated in fiberglass couplings into the side wall of the access sump for attachment of fiberglass pipe by means of fiberglass lamination or by means of a common rubber reducer seal used in the plumbing industry. Manufacturers of steel access sumps provided welded on couplings which served a similar purpose. Later, as molded polyethylene access sumps began to be introduced to the market, a variety of pipe entry seals were employed to accommodate all the available types of piping systems. Listed in order of their introduction are descriptions of these pipe and conduit sealing means. (a) A plastic molded cuff which was installed over an opening in the side wall which was attached by means of plastic welding in the field. This plastic cuff, was similar in design and purpose to those provided with the fiberglass and steel access sumps for sealing pipe entries. (b) A conventional plastic bulkhead fitting was used for conduit entries. (c) A commercially available rubber grommet was offered to replace the plastic cuffs and bulkhead fittings for sealing both pipe and conduit entries. The rubber grommet was installed into an opening in the side wall of the access sump. (d) A rubber flanged boot was offered as a solution to the leaking rubber grommets. This rubber boot is inserted inside an opening in the side wall of the access sump and mechanically attached to the side wall by means of bolt fasteners. The significant advantage of this type of sealing device was that it provided a watertight seal for both conduit and pipe entries that could be installed in any desired location in the side wall of the access sump. These various sealing devices evolved over time to accommodate most of the secondarily contained piping systems described above. Only two types of conduit sealing means were developed for a specific application which are described as follows: (a) A plastic internal facing cuff was molded in at specific locations into the side wall of the polyethylene access sumps to seal flexible corrugated polyethylene containment pipe entries. These sumps were a required component of a secondarily contained underground piping system which features a flexible nylon composite supply pipe fully contained by a larger flexible polyethylene containment pipe. (b) A plastic external facing cuff was integrally molded at specific locations into the side wall of the polyethylene access sumps to seal thick walled smooth flexible containment pipe entries. These sumps were required components of a secondarily contained underground piping system which features a flexible rubber composite supply pipe fully contained by a larger flexible polyurethane composite containment pipe.

The introduction of continuous flexible supply pipe, a number of years ago, was a means of reducing the amount of connection joints in the supply pipe compared to the commonly used steel and fiberglass nonflexible supply piping systems. The first flexible supply pipe which was introduced was a non-contained thin walled flexible copper tubing which was directionally bent to accommodate the routing required to connect the tanks pump to the various dispenser. The second flexible supply piping system was introduced in Europe, which was a direct burial or non-contained flexible polyethylene tubing which had thick wall and offered only a limited amount of flexibility. Both of these flexible supply piping systems did not require the use of access sumps. The third flexible supply piping was introduced several years ago and was secondarily contained inside a flexible containment pipe and did require the use of access sumps. Two versions of this type flexible piping system were introduced approximately at the same time and are briefly described above.

Some notable advantages of these flexible double wall piping systems include considerably fewer piping joints than conventional double wall piping systems and also provide the unique feature of removing the supply pipe, in the event of a problem, without the need for excavation. These systems feature continuous lengths of both flexible supply pipe and flexible containment pipe which are made available in rolls of very long lengths. From these long lengths, pipe sections may be custom cut to length for installation between two or more surface access sumps. This feature eliminates the need for any directional fittings in the flexible containment pipe line, thus eliminating the need of any piping joints between the interconnected access sumps. The flexible primary piping does require the use of directional fittings but these fittings are located within the surface access sumps where they are surface accessible for inspection and maintenance. This piping design permits complete access to and observation of all the primary and secondary piping joints from the ground surface without the need for excavation.

Some notable disadvantages of both of these flexible double wall piping systems are as follows: (a) Thin walled corrugated flexible containment pipe is easy to damage and difficult to repair. The inner corrugations restrict fluid migration from the source of the leak to the collection sump. The thin polyethylene material will not meet the UL standard for secondary containment. (b) Thick walled non-corrugated flexible containment pipe requires the use of a soft elastomeric material in order to achieve limited flexibility. It is questionable as to whether or not this material will meet the UL standard for secondary containment. (c) Inner corrugated flexible supply pipe provides good flexibility but poor hydraulic flow efficiency and a low maximum operating pressure. The internal corrugations cause to pipe to be pressure expandable, which can produce faulty readings for in-line leak detection devices and make it difficult to connect internally expanded coupling devices, which could result in a leak. (d) Thick walled flexible rubber supply pipe is heavy and has a highly resistive outer surface which makes it difficult to install into the flexible containment pipe. Rubber material is an unsatisfactory material to use as a supply pipe and will not likely meet the UL standard for primary containment.

All of the secondarily contained piping systems and access sumps discussed above have developed over a relatively short period of time in response to the continuously changing environmental and safety regulations. The design criteria used by various manufacturers for the development of their products was dependent on what the considered to be important and what they felt they had the capability to produce. As a result none of the assembled systems described above is the absolute solution to a secondarily contained underground piping system. Certain component parts and design concepts of these discussed containment systems provide only partial solutions in developing an ideal piping containment system which meets the most important design criteria.

SUMMARY OF THE INVENTION

It is the objective of the present invention to provide two types of environmentally safe piping systems which improves on the design, material selection, installation and cost deficiencies of those underground piping systems described above and others which exist, but not mentioned, in this text. Both of these double wall piping systems are used for conveying hazardous liquids from an underground storage tank to an above ground liquid dispensing unit typically found at service stations.

The present invention provides the first type double wall piping systems which consists of a secondarily contained underground piping system which features a flexible primary supply pipe fully contained by a larger non-flexible secondary containment pipe. The flexible supply has a smooth outer and inner wall and requires metallic couplings installed on each end of a pipe section for attachment to a metallic directional supply fitting. The outer secondary containment pipe would consist of an assembly of straight pipe sections interconnected by compression couplings and directional long radius fittings.

The second type of double wall piping system provided in this invention consists of a secondarily contained underground piping system which features a flexible coaxial pipe whereby both the inner primary supply pipe is integral with the outer secondary containment pipe. This coaxial construction allows that this dual purpose pipe can provide the means of both primary liquid supply and secondary containment within the same pipe.

The invention employs the use of the use of surface access sumps which are interconnected by runs of double wall pipe. These access sumps provide a means of containment for the metallic supply couplings and fittings as well as connecting and sealing of all piping entries into the wall of the access sumps. These access chambers are typically installed around the underground storage tanks pump and underneath above ground liquid dispensing units. These access chambers serve as a means of access to a tanks submersible pump and associated plumbing connections as well as access to a dispensers plumbing and safety valves and flexible connectors. In addition these access chambers provide a means of secondary containment for the contained plumbing components and may serve as a product collection well which is required for many leak detection systems to signal an alarm. They may also serve as a final or intermediate product collection well for double wall piping systems which may enter or pass through the chamber.

The invention employs the use of an improved double wall pipe which is made of materials which has a permeability rating which is acceptable to meet U.L. standards for primary containment systems, which store flammable liquids. In addition, the primary supply pipe has a smooth inner surface for improved hydraulic flow, coupling capabilities and ease of installation.

Both the first and second type of double wall piping systems provides an outer secondary containment pipe or barrier which has inner surface which is non-restricting of fluid migration, from a leak originating at a point in either the primary or secondary wall, to a leak detection sensor. The invention also employs the use an improved selection of materials which provide a much improved permeability rating suitable to meet U.L. standards for secondary containment systems which store flammable liquids.

Both types of double wall piping systems are assembled by using the same associated primary supply plumbing components and access chambers in such a manner that each provides completely environmentally safe underground piping system.

The following drawings, drawing descriptions and claims will further explain how the invention is interconnected, installed, inspected, tested and continuously monitored.

DESCRIPTION OF THE INVENTION

Figure 1:
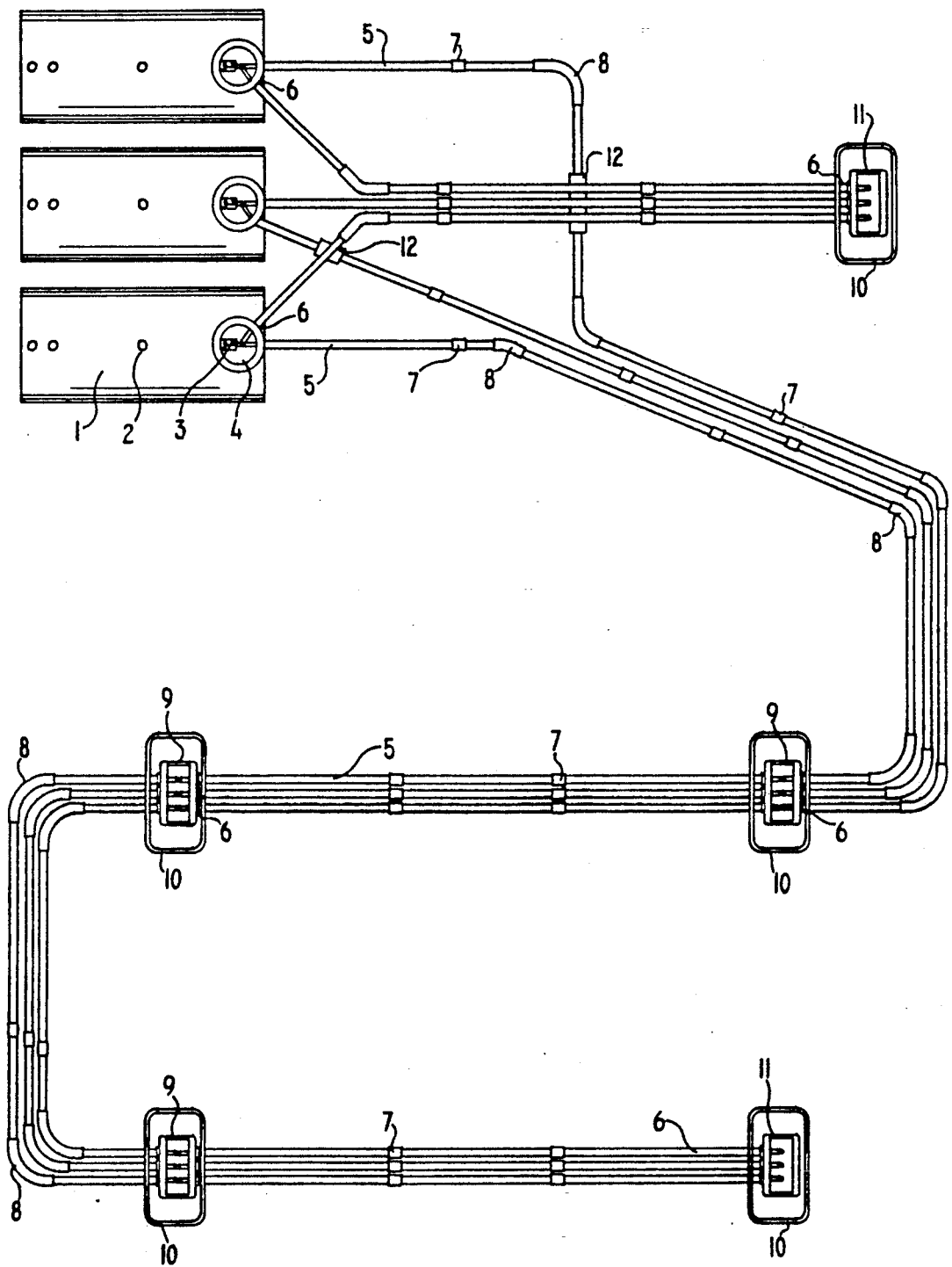
FIG. 1 is diagrammatic overhead plan view of a fuel storage, transmission and dispensing facility which includes originating, junction and terminating surface access chambers interconnected by a secondarily contained piping system.

Referring to FIGS. 1, a typical service station facility primarily consists of one or more underground fuel storage tanks 1, fitted on top with numerous inner access bungs 2. Installed into and through one of the access bungs is the tanks pump 3 which is contained within the pump access chamber 4.

A non-flexible containment pipe section 5 exits through an opening in the originating chamber and a flexible entry seal 6 which is physically attached and sealed to the side wall of the originating chamber by means of internal fasteners. The non-flexible containment pipe is connected and sealed to the flexible entry seal, on the inside of the originating chamber by means of a metal band clamp.

Individual lengths of non-flexible containment pipe are interconnected together by couplings 7 and various directional couplings 8. The inside diameter and bend radius of these directional couplings is sufficient to permit the flexible supply pipe to be installed after the secondary containment system has been completely installed and integrity tested.

The directional couplings permits the non-flexible containment pipe to be connected in such a manner that it can be routed to the first junction chamber 9, which is installed within a pre-engineered island form 10 which typically is installed above the ground surface. The non-flexible containment pipe enters the junction chamber though an opening in the lower side wall and through a preattached flexible entry seal 6. The first non-flexible piping run terminates just beyond the inside opening of the flexible entry seal where it is sealed using the band clamp previously described.

In a junction chamber application, a second non-flexible containment piping run begins and exits on the opposite side wall of the junction chamber from where the first non-flexible piping run entered. This second piping run exits though the inside opening of the flexible entry seal 6 which is preattached to the junction chamber over an opening in the wall.

The non-flexible containment pipe is then routed and connected to the next junction chamber in a manner as previously described in the proceeding three paragraphs. This same procedure repeats itself again and again until the last terminating chamber 11 is reached, located at the end of a non-flexible containment piping line. Only one non-flexible containment piping run enters this terminating chamber and no containment piping exits on the opposite side.

For piping applications which have more than one containment piping run exiting the originating chamber, a typical routing of the second containment piping run will require the piping to cross over or under the first piping run. In order to prevent damage to one or both pipes at the crossover point, due to burial loads or constant vibration a crossover conduit section 12 is installed over the lower pipe to separate it from the upper pipe.

As illustrated at the top of FIG. 1, a containment piping line may not consist of any intermediate junction chambers but only one terminating chamber. In addition, fuel storage and distribution facilities will vary in the amount and arrangement of underground storage tanks and above ground product dispensers employed. This will result in a variety of pipe routing layouts other than that shown in FIG. 1, however the principal design factors of using a secondary containment system which uses two or more surface access chambers interconnected by a non-flexible containment piping run that contains a flexible primary supply piping system, is still maintained.

Figure 2:
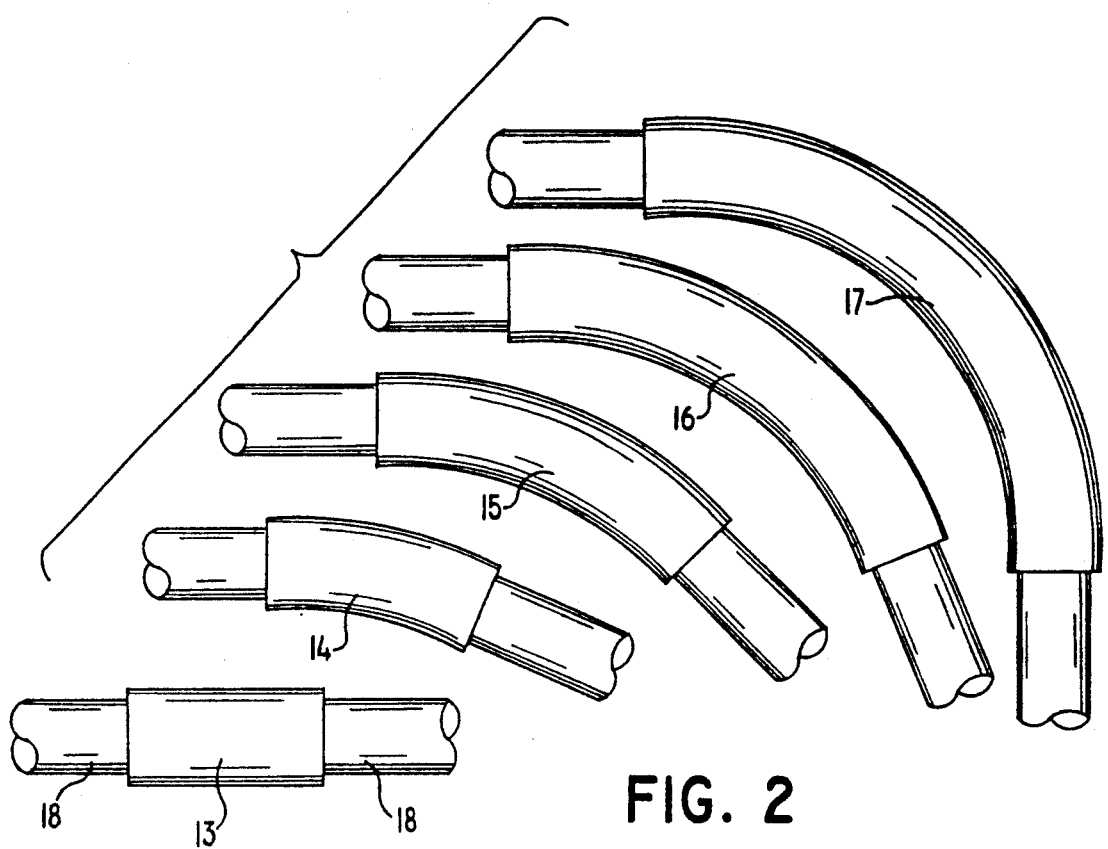
FIG. 2 is a side view of the non-flexible containment pipe lengths installed into four different directional long bend radius directional couplings and one straight coupling, all of which are joined by an adhesive resin.

FIG. 2 shows the straight coupling 13 which is used to connect two straight sections of non-flexible containment pipe 18 together. Also shown are the directional couplings which are available to change the direction and make connection of two lengths of non-flexible containment pipe. These directional couplings have a gradual directional turn so as not to interfere with the later installation of the flexible primary pipe which is fitted on each end with a hose coupling. The directional couplings shown consist of 22½ degree elbow fitting 14, a 45 degree elbow fitting 15, a 67½ degree elbow fitting 16 and a 90 degree elbow fitting 17.

Figure 3:
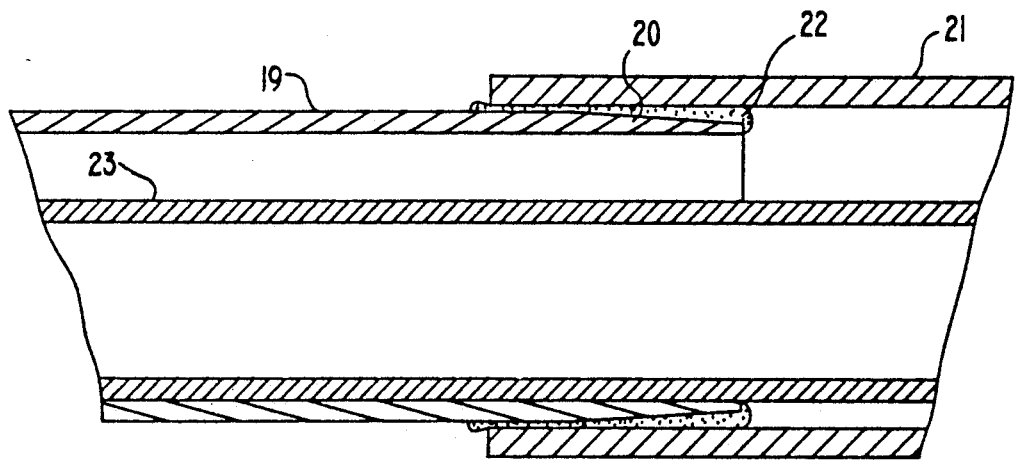
FIG. 3 is a sectional side view of the non-flexible containment pipe length installed into a coupling which is joined by an adhesive resin.

FIG. 3 shows the end section of a non-flexible containment pipe 19, which has a tapered end 20, installed inside a coupling 21. The joint created is an overlap joint whereby the couplings and fittings have a slightly larger inside diameter than the outside diameter of the end portion of the non-flexible containment pipe whereby a bonding adhesive 22 is applied between this overlap joint. The bonding adhesive used is generally a thermal-set, two-part resin which when cured creates a homogeneous bond between the coupling and/or fittings and the non-flexible containment pipe. Also shown, is the smooth wall flexible supply pipe 23 deposed within the non-flexible containment pipe and coupling.

Figure 4:
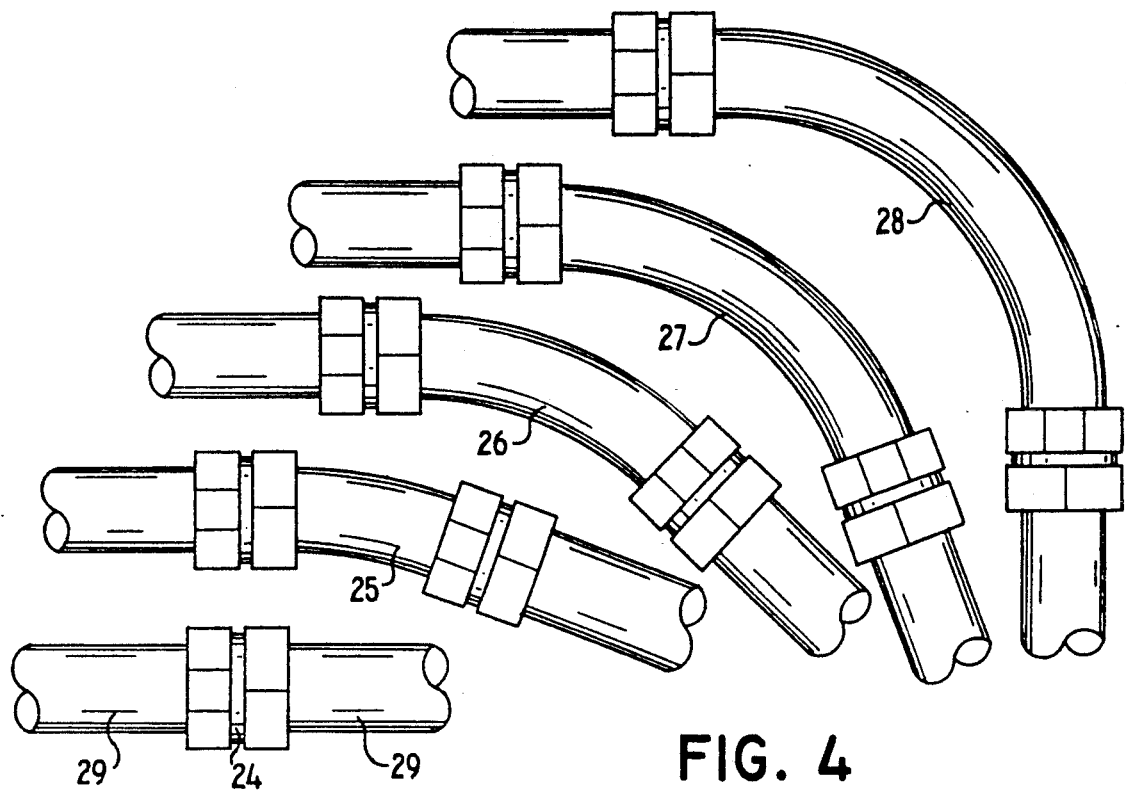
FIG. 4 is a side view of the non-flexible containment pipe lengths installed into four different directional long bend radius directional couplings, all of which are joined by means of compression coupling.

FIG. 4 shows the compression coupling 24 used to connect two straight sections 29 of non-flexible containment pipe together. Also shown are the directional couplings which are available to change the direction and make connection of two lengths of non-flexible containment pipe by means of the compression coupling located over both joints. These directional couplings have a gradual directional turn so as not to interfere with the later installation of the flexible primary pipe which is fitted on each end with a hose coupling. The directional couplings shown consist of 22½ degree elbow fitting 25, a 45 degree elbow fitting 26, a 67½ degree elbow fining 27 and a 90 degree elbow fitting 28. Note: These directional couplings can be made in the field by using conventional plastic pipe bending equipment.

Figure 5:
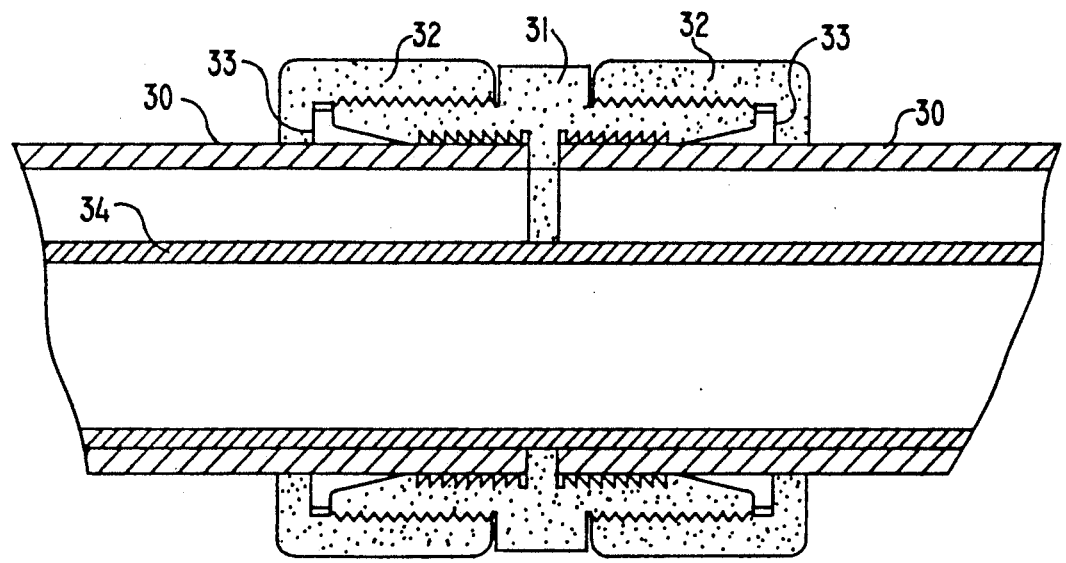
FIG. 5 is a sectional side view of two non-flexible containment pipe lengths joined together by means of a compression coupling.

FIG. 5 shows two end sections of a non-flexible containment pipe 30, installed inside a compression coupling 31. The joint created is an overlap butt joint whereby the compression couplings has a slightly larger inside diameter than the outside diameter of the end portion of the non-flexible containment pipe and also provides an internal stop to butt both ends of the non-flexible pipe. A tapered annular seal 33 is installed at the back end of the compression coupling and is compression wedged into a tapered section of the compression coupling by means of a threaded compression cuff 32. Also shown is the smooth wall flexible supply pipe 34 deposed within the non-flexible containment pipe and compression coupling.

Figure 6:
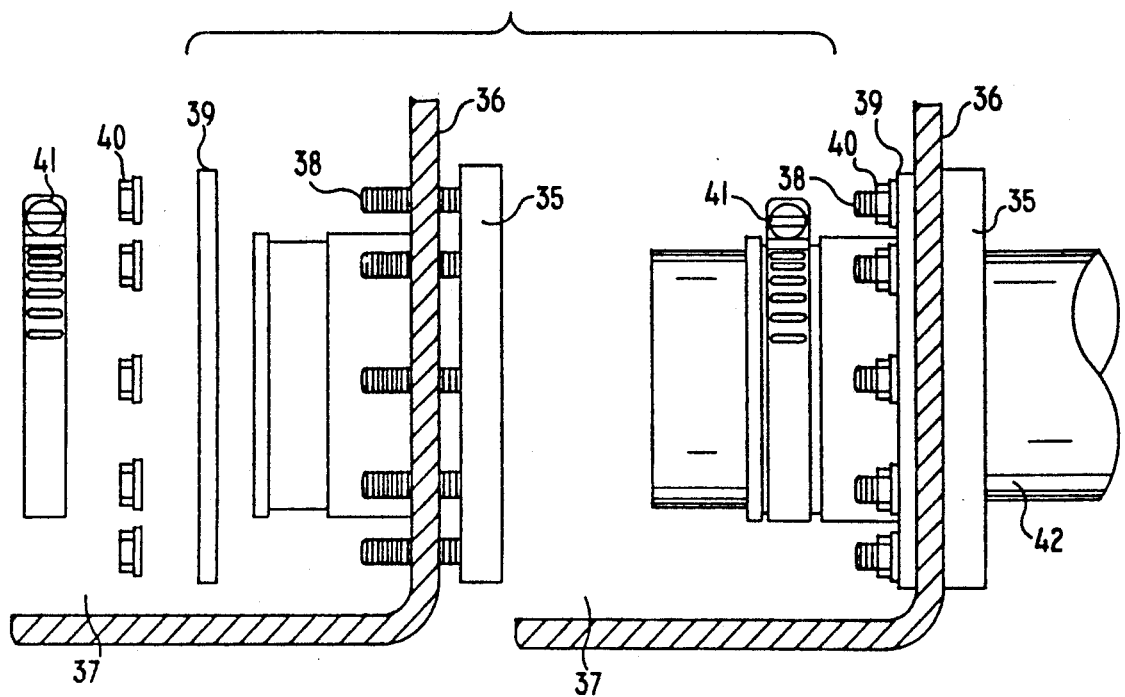
FIG. 6 is a sectional side view of an access chamber wall showing the installation and final assembly of a sealing device connected to the non-flexible containment pipe.

FIG. 6 shows how the flexible entry seal 35 is installed into the flat side wall 36 of a access sump 37. A opening and numerous bolt holes are drilled into the lower flat side wall and the flexible entry seal and it's stud fasteners 38 are inserted through the opening and bolt holes. Once fully inserted, the metal compression ring 39 is installed over the protruding stud fasteners. Next the nut fasteners 40 are installed onto the stud fasteners and tightened. Next the metal band clamp 41 is then installed loosely over the opening of the flexible entry seal and the non-flexible containment pipe 42 is inserted into the opening of the flexible entry seal from outside the access sump. Once inserted, the end of the non-flexible containment pipe should extend about 2 inches beyond the inside opening of the flexible entry seal and then tighten the metal band clamp.

Figure 7:
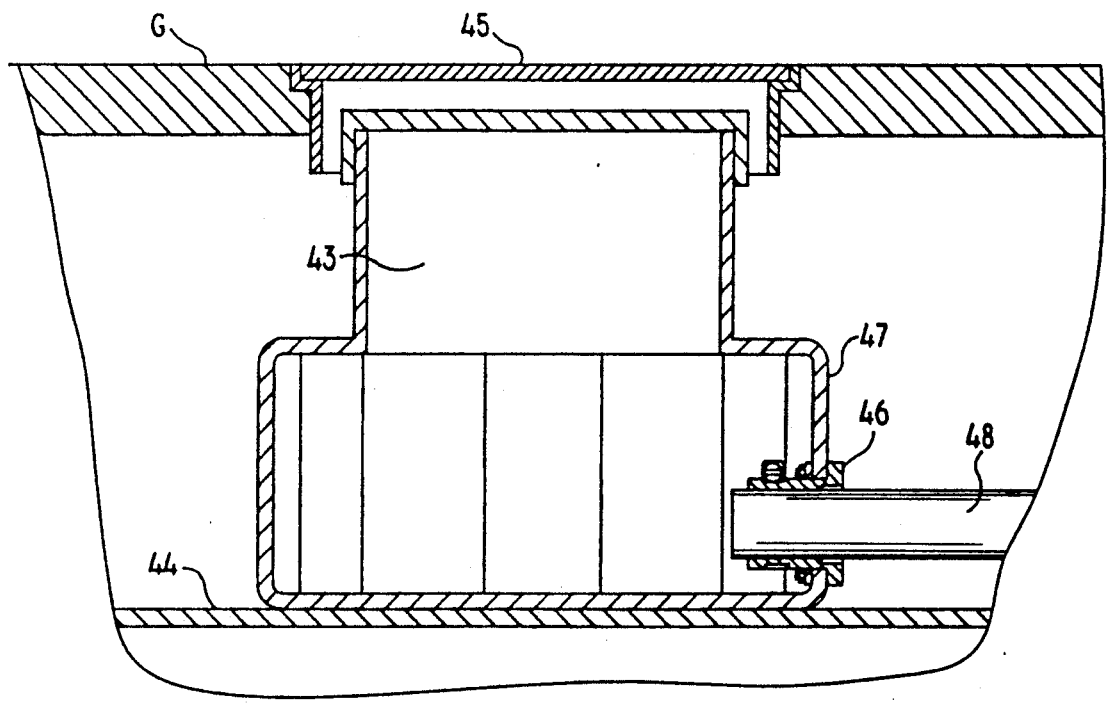
FIG. 7 is a sectional side view of the originating chamber showing the connection of one non-flexible containment pipe section to the wall of the chamber.

FIG. 7 shows an originating chamber 43 installed to the top of an underground storage tank 44 and situated under a steel access manhole cover 45. The originating chamber is shown to have a flexible entry seal 46 installed in the lower flat side wall 47 with a non-flexible containment pipe 48 installed within.

Figure 8:
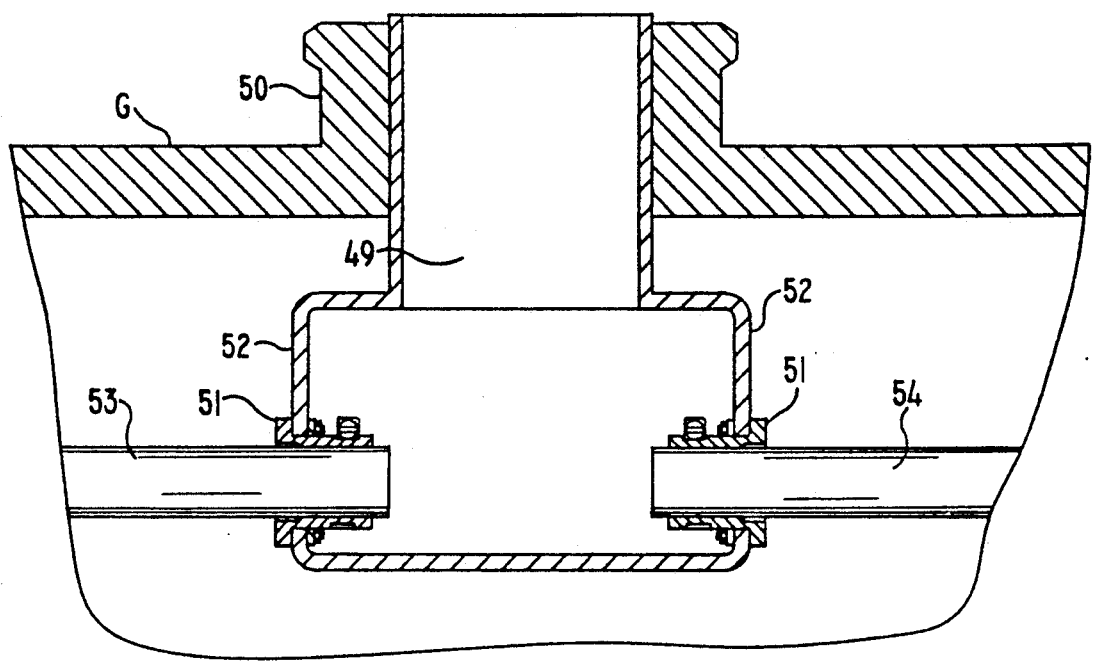
FIG. 8 is a sectional side view of the junction chamber showing the connection of two non-flexible containment pipe sections to the walls of the chamber.

FIG. 8 shows a junction chamber 49 installed within and under a dispenser island 50. The junction chamber is shown to have two flexible entry seals 51 installed into both lower side walls 52. One flexible entry seal is connected to a non-flexible containment pipe 53 which is entering the junction chamber and the other is connected to a non-flexible containment pipe 54 which is exiting the junction chamber.

Figure 9:
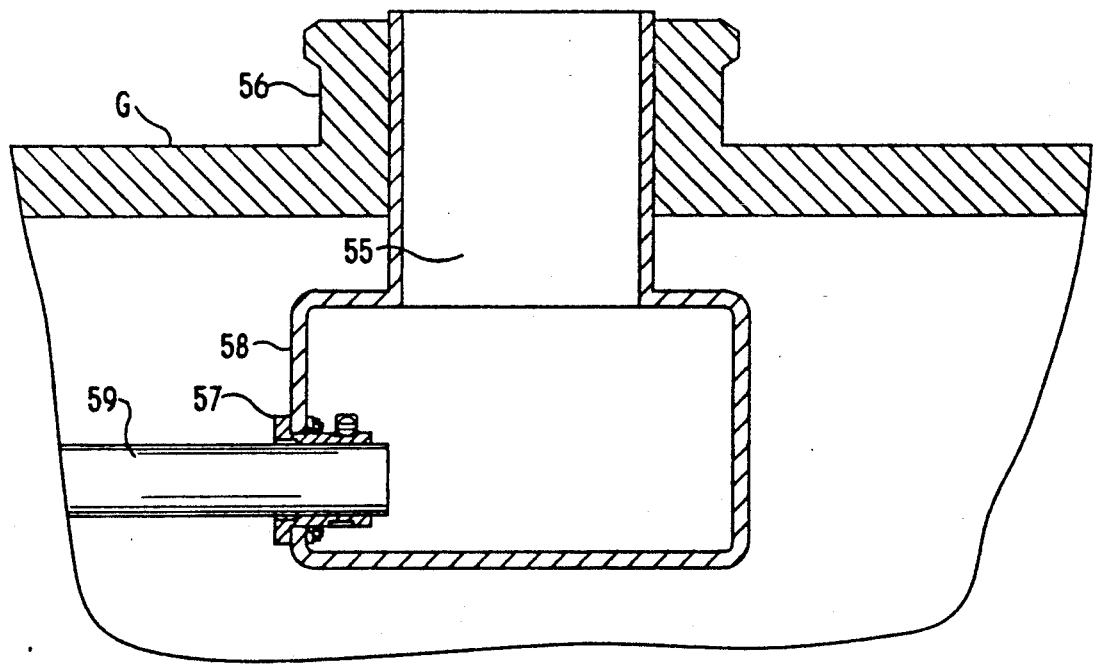
FIG. 9 is a sectional side view of the terminating chamber showing the connection of one non-flexible containment pipe section to the wall of the chamber.

FIG. 9 shows a terminating chamber 55 installed within and under a dispenser island 56. The terminating chamber is shown to have one flexible entry seal 57 installed into the lower side wall 58 with a non-flexible containment pipe 59 installed within. The connection of the non-flexible containment pipe to the flexible entry seal is the termination of the non-flexible secondary containment piping line.

Figure 10:
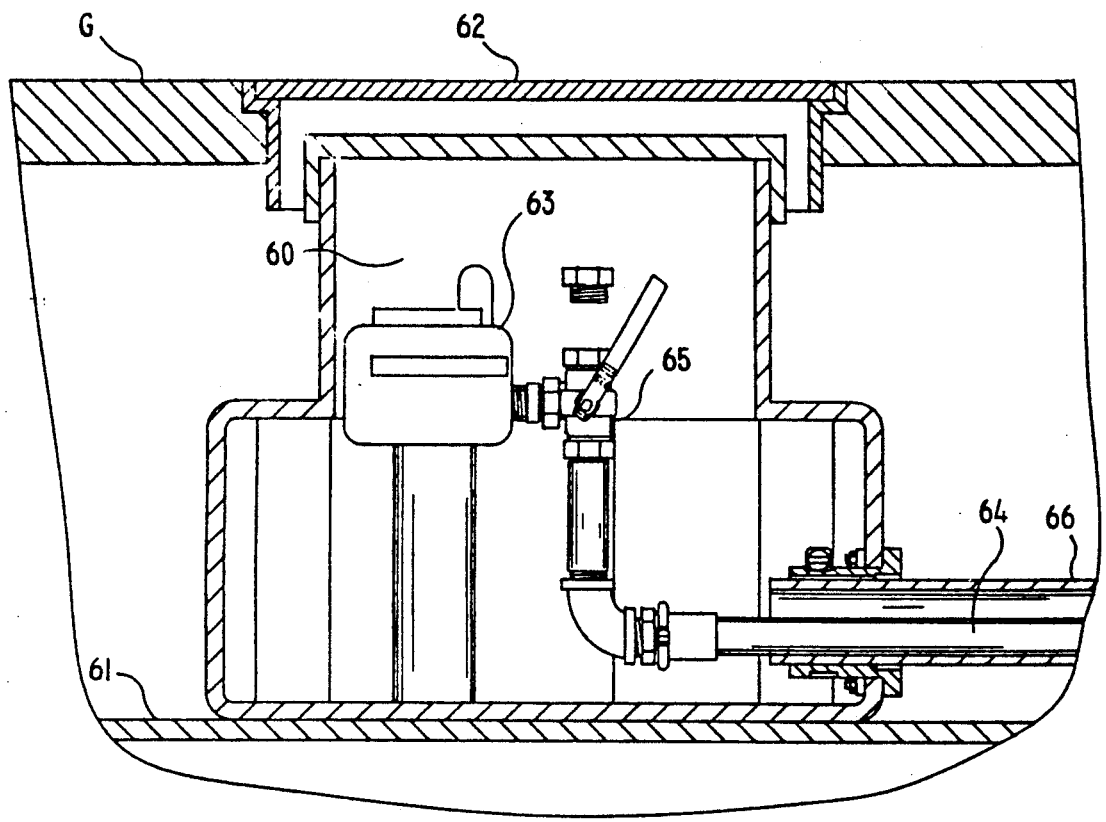
FIG. 10 is a sectional side view of a originating chamber showing one flexible supply pipe section installed within one non-flexible containment pipe section and connected to the tanks dispensing pump by the originating plumbing assembly.

FIG. 10 shows a originating chamber 60 installed to the top of an underground storage tank 61 and situated under a steel access manhole cover 62. The originating chamber is shown to have a dispensing pump 63 installed within the originating chamber and connected to the flexible supply pipe 64 by an originating plumbing assembly 65. The flexible supply pipe exists the originating chamber through the non-flexible containment pipe 66.

Figure 11:
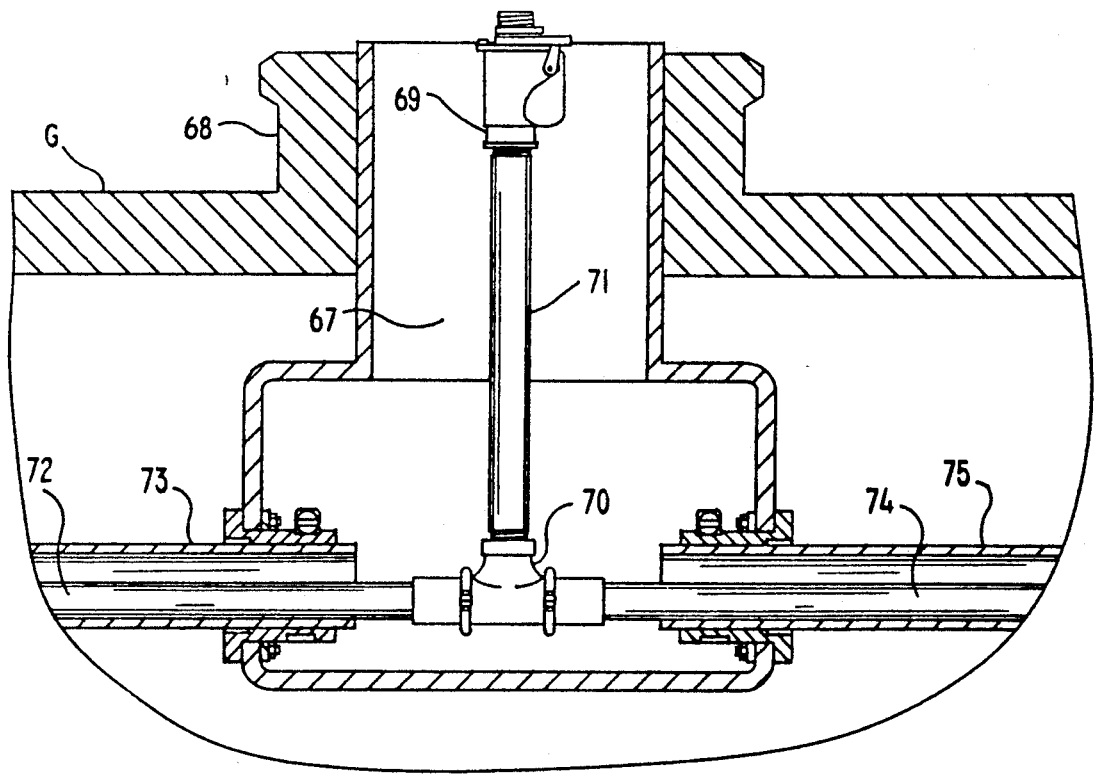
FIG. 11 is a sectional side view of the junction chamber showing two flexible supply pipe sections installed within two non-flexible containment pipe sections and connected to the dispenser's safety valve by the junction plumbing assembly.

FIG. 11 shows a junction chamber 67 installed within and under a dispenser island 68. The junction chamber is shown to have a dispenser safety valve 69 installed within and connected to the junction plumbing assembly 70 by a non-flexible supply pipe 71 section which is threaded on the upper end. The junction plumbing assembly is connected to one flexible primary pipe 72 which enters the junction chamber through the non-flexible containment pipe 73 and to another flexible supply pipe 74 which exits the junction chamber through the other non-flexible containment pipe 75.

Figure 12:
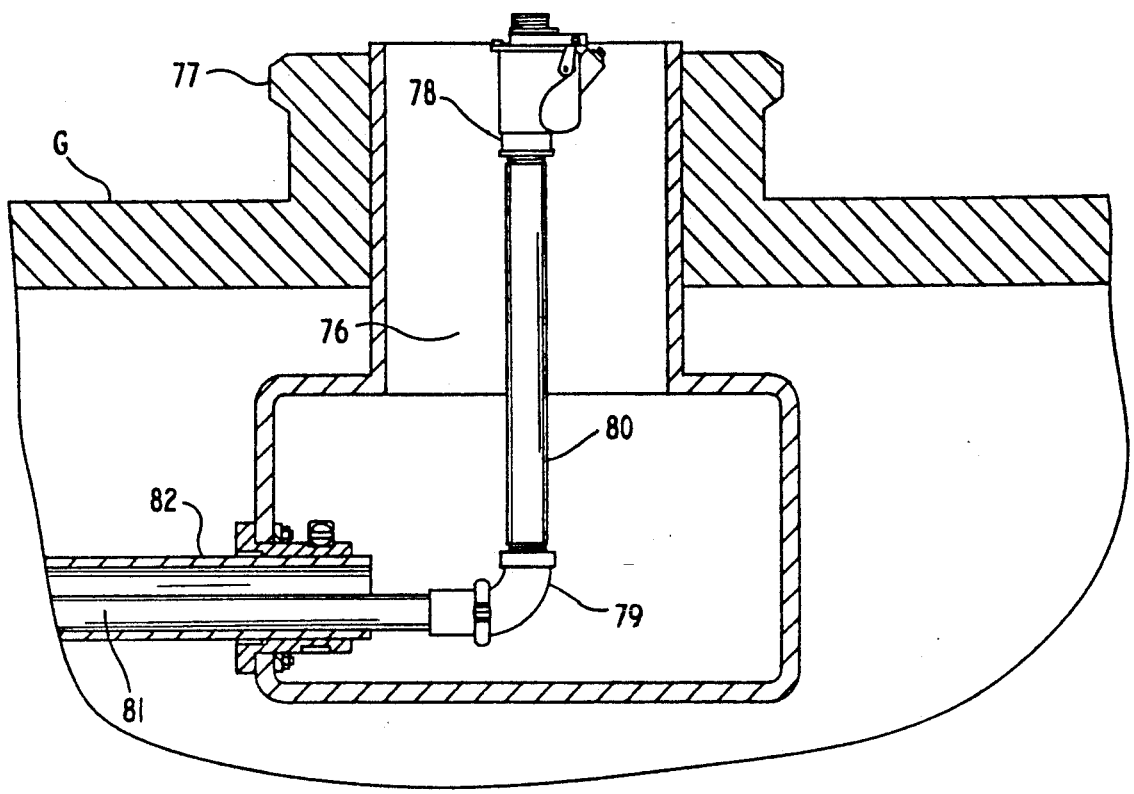
FIG. 12 is a sectional side view of the terminating chamber showing one flexible supply pipe section installed within one non-flexible containment pipe section and connected to the dispenser's safety valve by the terminating plumbing assembly

FIG. 12 shows a terminating chamber 76 installed within and under a dispenser island 77. The terminating chamber is shown to have a dispenser safety valve 78 installed within and connected to the terminating plumbing assembly 79 by a non-flexible supply pipe 80 section which is threaded on the upper end. The terminating plumbing assembly is connected the flexible primary pipe 81 which enters the terminating chamber through the non-flexible containment pipe 82. The final connection to the dispenser safety valve is the termination point of the supply piping line.

Figure 13:
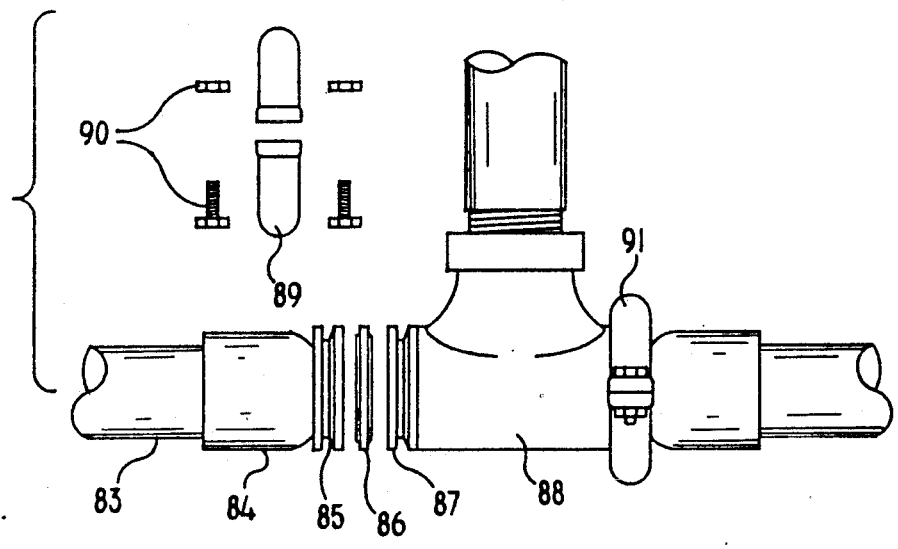
FIG. 13 is a side view of how the flexible supply pipe coupling is connected and sealed to a plumbing assembly.

FIG. 13 shows a means of attaching and sealing the flexible primary pipe 83 to a plumbing assembly 88. The flexible primary pipe section is fitted on each end with an internally expanded coupling 84 which has a butt flange profile 85. The fitting located at the low end of a plumbing assembly has an identical butt flange profile 87 as that of the coupling. The sealed connection is made by compressing an o-ring seal (Viton rubber) 86 between the butt flange of the coupling and the butt face flange of the primary fitting by means of a clamshell clamp 89 which is drawn together over both butt flanges by means of two bolt fasteners 90. Once the clamshell clamp 91 is assembled, it provides a high pressure rated sealed connection. This connection and sealing method requires only a nut drive to tighten the fasteners. This makes for a faster more convenient installation and quick disconnect of the coupling if necessary. This system also eliminates the need for a male and female threaded connections, like used on other flexible supply pipe products, which can strip or be insufficiently tightened, resulting in a leak. The short length and low profile of the coupling device, of the invention, permits the secondary containment pipe line to have a smaller inside pipe diameter and make directional turns with a shorter bend radius. Other flexible supply pipe products use longer and larger profile couplings and require a containment pipe with a larger inside diameter, in order to prevent pipe hang-ups when encountering short directional turns.

Figure 14:
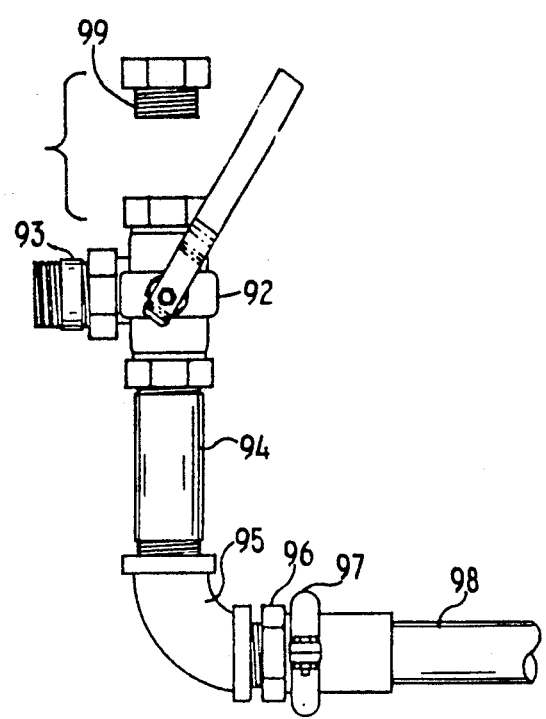
FIG. 14 is a side view of a single outlet plumbing tree assembly which connects the tanks pump to one flexible supply pipe section, all contained within the originating chamber.

FIG. 14 shows a side view of the single originating plumbing assembly which is installed inside the originating chamber to provide a plumbing transition from the dispensing pump to a single flexible supply piping line. The single originating plumbing assembly consists of three-way diverter valve 92 which permits the tank and pump to be isolated (shut-off) from the supply piping line. The single originating plumbing assembly is connected to the dispensing pump by means of a threaded nipple 93. A threaded extension nipple 94, which is connected to the underside opening of the diverted valve, is cut-to-length for height adjustability of the elbow fitting 95, which is the lower section of the single originating plumbing assembly. The elbow fitting is fitted with a butt flange coupling 96 to make the transition from a threaded opening to a butt flange profile for connection of the supply pipe coupling 98 by means of the clamshell clamp 97. The diverter valve has a threaded opening to accept a threaded plug 99. This threaded opening can be used to install various types of in-line leak detection devices.

Figure 15:
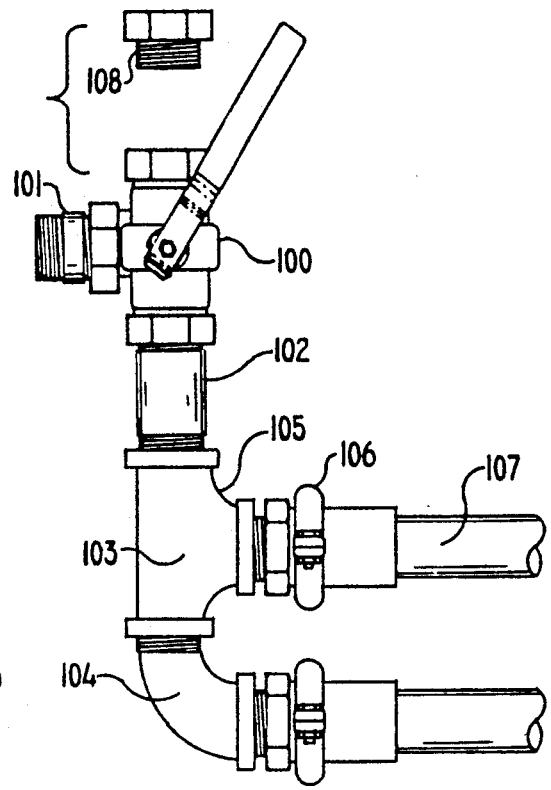
FIG. 15 is a side view of a dual outlet plumbing tree assembly which connects the tanks pump to two flexible supply pipe sections, all contained within the originating chamber.

FIG. 15 shows a side view of the dual originating plumbing assembly which is installed inside the originating chamber to provide a plumbing transition from the dispensing pump to two flexible supply piping lines. The dual originating plumbing assembly consists of three-way diverter valve 100 which permits the tank and pump to be isolated (shut-off) from the primary piping line. The plumbing tree is connected to the dispensing pump by means of a threaded nipple 101. A threaded extension nipple 102, which is connected to the diverter valve, is cut-to-length for height adjustability of the primary tee fitting 103, which is attached directly below. A primary street elbow fitting 104 is attached directly to the primary tee fitting to provide the second outlet. A butt flange coupling 105 is attached to the tee fitting and the street elbow fitting, of the dual originating plumbing assembly, to make the transition from a threaded opening to a butt flange profile for connection of both primary pipe couplings 107 by means of the clamshell clamps 106. The diverter valve has a threaded opening to accept a threaded plug 108. This threaded opening can be used to install various types of in-line leak detection devices. Employing the use of the dual outlet plumbing tree, connected to the tanks dispensing pump, provides a means of exiting the originating chamber with two double wall piping lines, one at a slightly higher elevation than the other. Exiting with two separate dispensing piping lines at different elevations permits pipe crossovers, described and shown shown in FIGS. 1 and 18 without creating low points in non-flexible containment piping, between access sumps, which could result in collection of leaking product. Another advantage of existing the pump access sump with two dispensing piping lines is that more above ground product dispensers may be supplied before there is a significant drop in fluid head pressure which can effect the volume of product which is dispensed at the above ground product dispenser. Typically a dispensing range of six to ten gallons per minute flow rating is acceptable for a retail fuel outlet such as a service station. One dispensing piping line supplying to many above ground product dispenser could result in a severe reduction, below the acceptable levels, if all of the product dispensers were activated simultaneously.

Figure 16:
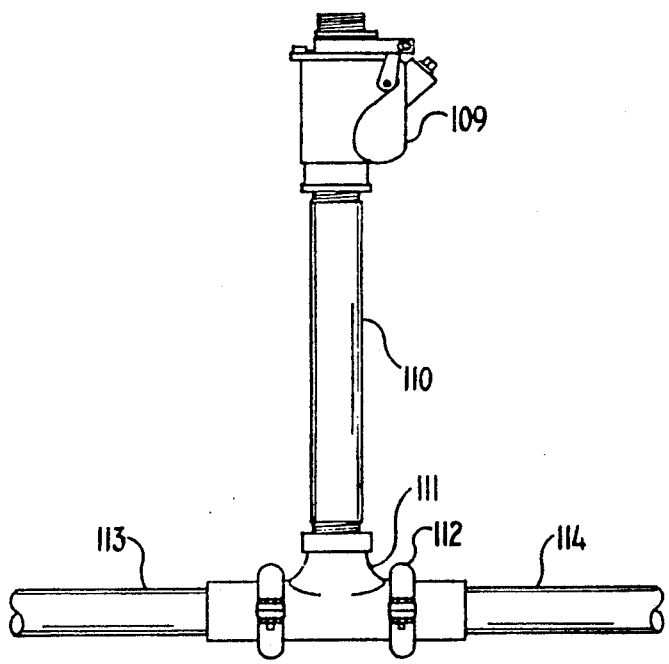
FIG. 16 is a side view of a junction plumbing assembly interconnected by two flexible supply pipe sections and one non-flexible supply pipe section which connects to the dispensers safety valve, all contained within the junction chamber.

FIG. 16 shows a side view of the junction plumbing assembly located inside of a junction chamber. This junction plumbing assembly consists of a safety valve 109 or shear valve which is designed to shear its connection to the above ground fuel dispenser, in the event that the dispenser cabinet should be knocked over in an accident. At the same moment an internal spring loaded flapper valve shuts-off any escaping fuel from the underground piping line. The safety valve is connected to the tee fitting 111 by a non-flexible threaded pipe 110, both components of the junction plumbing assembly, which is cut to length and threaded for height adjustability of the tee fitting. Both the incoming flexible supply pipe 113 and the outgoing flexible supply pipe 114 are connected to the junction plumbing assembly at the tee fitting, by means of the two clamshell clamps 112.

Figure 17:
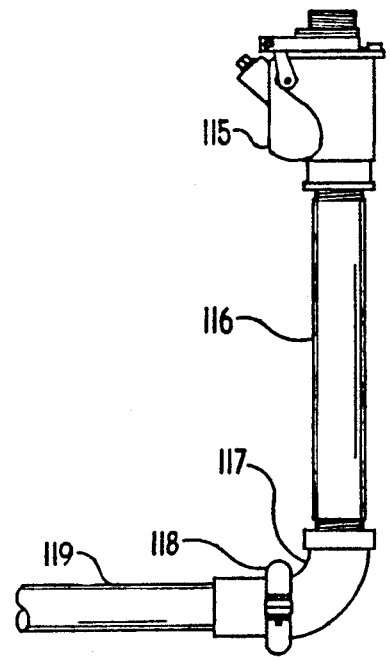
FIG. 17 is a side view of a terminating plumbing assembly interconnected by one flexible supply pipe section and one non-flexible supply pipe section which connects to the dispenser safety valve, all contained within the terminating chamber.

FIG. 17 shows a side view of the terminating plumbing assembly located inside of a terminating chamber. This terminating plumbing assembly consists of a safety valve 115 or shear valve, which is designed to shear its connection to the above ground fuel dispenser, in the event that the dispenser cabinet should be knocked over in an accident. A the same moment an internal spring loaded flapper valve shuts-off any escaping fuel from the underground piping. The safety valve is connected to the supply elbow fitting 117 by a non-flexible threaded pipe 116, both components of the junction plumbing assembly, which is cut to length and threaded for height adjustability of the supply tee fitting. The incoming and terminating flexible supply pipe 118 is connected to the supply elbow fitting by means of the clamshell clamp 119.

Figure 18:
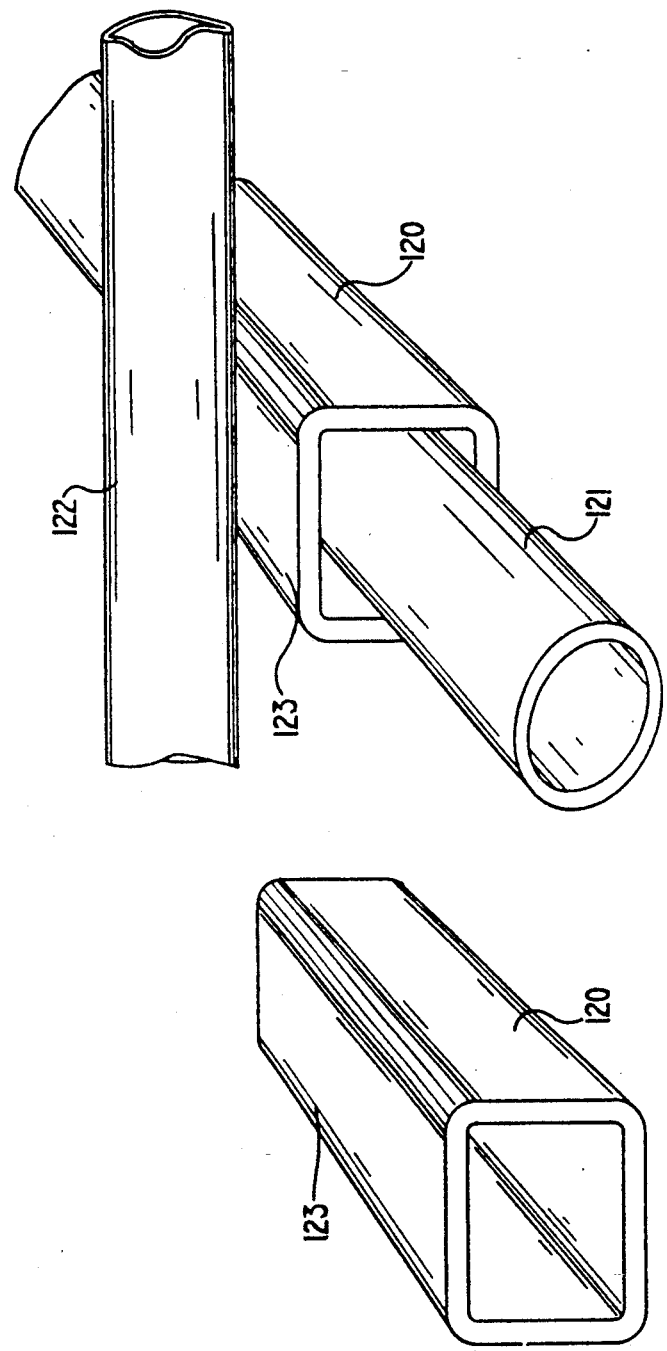
FIG. 18 is a perspective view of cross-over conduit with the non-flexible containment pipe installed inside and overhead.

FIG. 18 shows a section crossover conduit 120. Also shown is how the crossover conduit is installed with the lower crossing non-flexible containment pipe 121 passing through the crossover conduit and the upper crossing non-flexible pipe 122 passing over the upper flat surface 123 of the crossover conduit.

Figure 19:
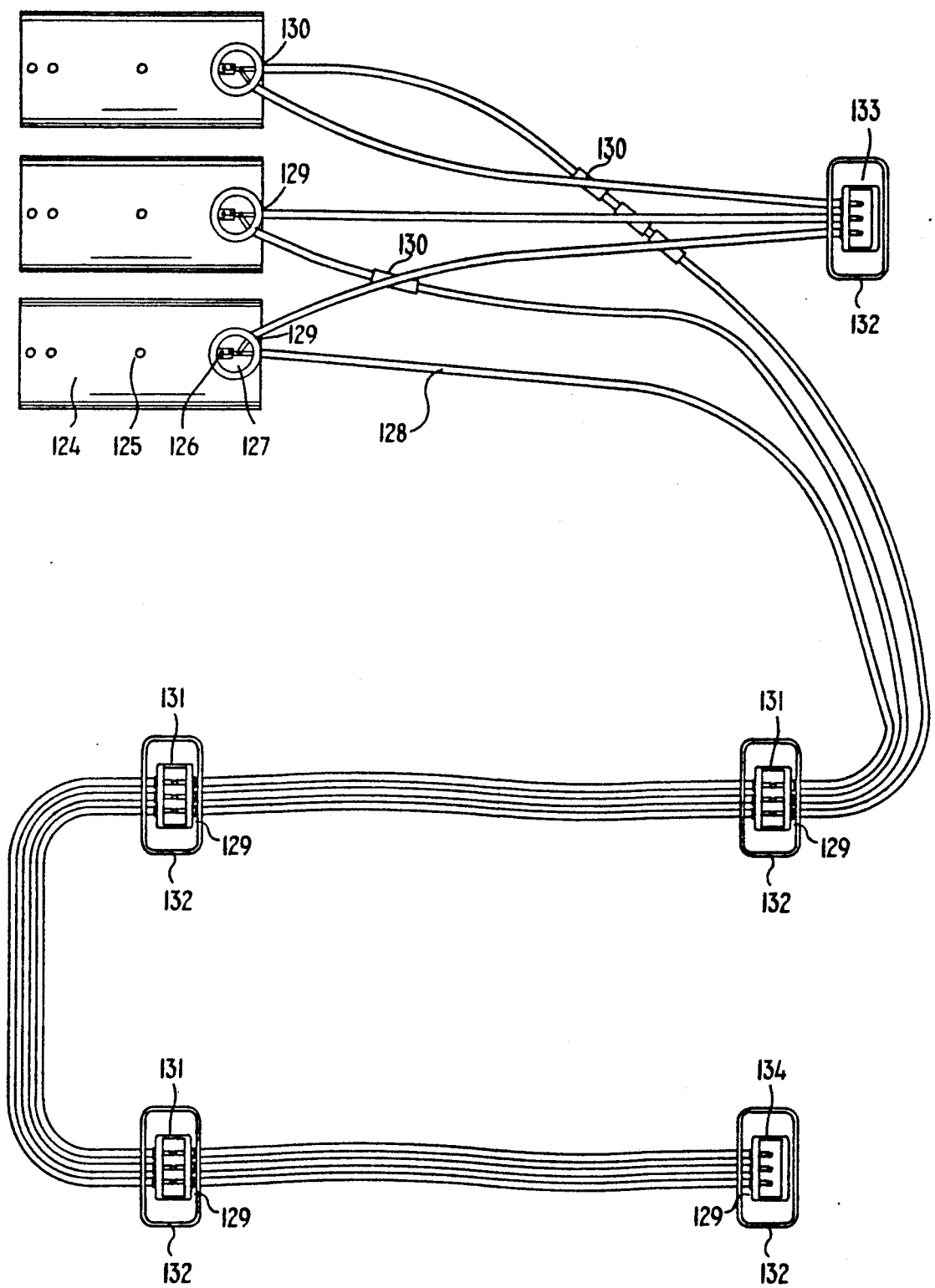
FIG. 19 is diagrammatic overhead plan view of a fuel storage, transmission and dispensing facility which includes originating, junction and terminating surface access chambers interconnected by a coaxial secondarily contained flexible piping.

FIGS. 19, shows a typical service station facility primarily consists of one or more underground fuel storage tanks 124, fitted on top with numerous inner access bungs 125. Installed into and through one of the access bungs is the tanks pump 126 which is contained within the pump access chamber 127.

A flexible direct bury coaxial piping section 128 exits through an opening in the originating chamber and a flexible entry seal 129 which is physically attached and sealed to the side wall of the originating chamber by means of internal fasteners. The flexible coaxial piping is connected and sealed to the flexible entry seal, on the inside of the originating chamber by means of a metal band clamp.

The flexible coaxial piping is routed to the first junction chamber 131, which is installed within a preengineered island form 132 which typically is installed above the ground surface. The flexible coaxial piping enters the junction chamber though an opening in the lower side wall and through a preattached flexible entry seal 129. The first flexible coaxial piping run terminates just beyond the inside opening of the flexible entry seal where it is sealed using the band clamp previously described.

In a junction chamber application, a second coaxial piping run begins and exits on the opposite side wall of the junction chamber from where the first non-flexible piping run entered. This second piping run exits though the inside opening of the flexible entry seal 129 which is pre-attached to the junction chamber over an opening in the wall.

The coaxial pipe is then routed and connected to the next junction chamber in a manner as previously described in the proceeding three paragraphs. This same procedure repeats itself again and again until the last terminating chamber 133 is reached, located at the end of a flexible coaxial piping line. Only one non-flexible containment piping run enters this terminating chamber and no flexible coaxial piping exits on the opposite side.

For piping applications which have more than one flexible coaxial piping run exiting the originating chamber, a typical routing of the flexible coaxial piping run will require the piping to cross over or under the first piping run. In order to prevent damage to one or both pipes at the crossover point, due to burial loads or constant vibration a crossover conduit section 130 is installed over the lower pipe to separate it from the upper pipe.

As illustrated at the top of FIG. 19, a flexible coaxial piping line may not consist of any intermediate junction chambers but only one terminating chamber 133. In addition, fuel storage and distribution facilities will vary in the amount and arrangement of underground storage tanks and above ground product dispensers employed. This will result in a variety of pipe routing layouts other than that shown in FIG. 19, however the principal design factors of using a flexible coaxial piping system which uses two or more surface access chambers, is still maintained.

Figure 20:
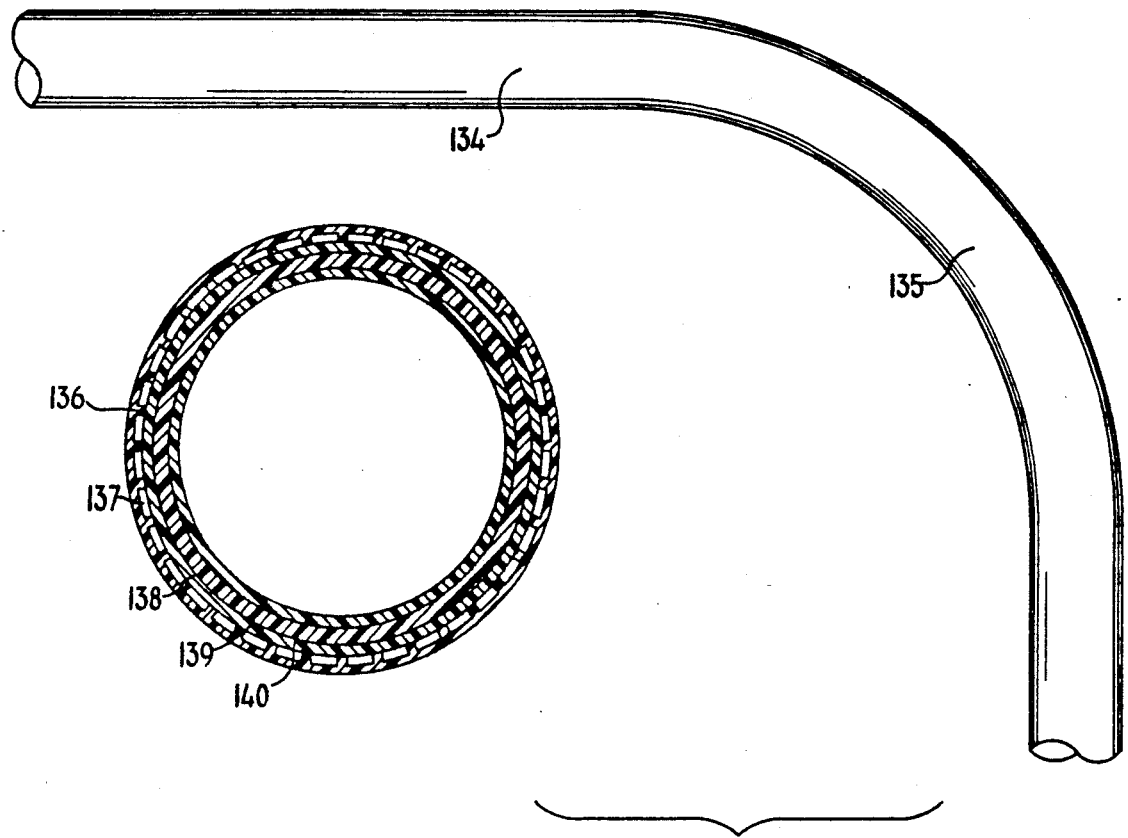
FIG. 20 is a side perspective view of the flexible coaxial primary supply and secondary containment piping showing its bend radius and a front end view showing its multi-layer construction.

FIG. 20 shows the flexibility of a section of the direct bury flexible coaxial piping 134 and its minimum installed bend radius 135. The typical installed bend radius should not be less than eight (6) times its diameter. The end of flexible single wall primary pipe section reveals a multilayer composite construction consisting of an outer damage protection and stand-off layer 136 consisting of a multitude of separator legs for creating an annular or interstitial space 137 for fluid migration, another damage protection and permeation barrier layer 138, an inner flexible filler layer 139 and a inner permeation barrier layer 140 which has smooth inner surface.

Figure 21:
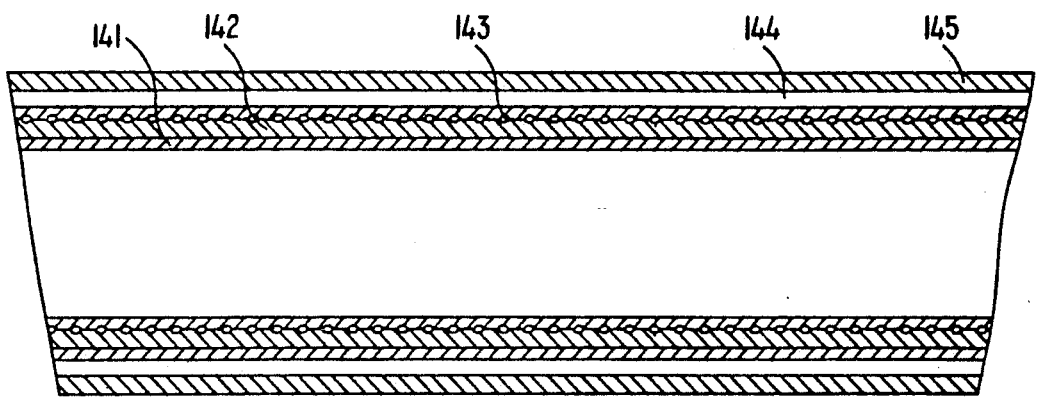
FIG. 21 is a side cross sectional view of the flexible coaxial primary supply and secondary containment piping showing its multi-layer construction.

FIG. 21 shows a cross sectional view of the direct bury flexible coaxial piping in more detail depicting the outer damage protection and stand-off layer 141 consisting of a multitude of separator legs for creating an annular or interstitial space 142 for fluid migration, another damage protection and permeation barrier layer 143, a cross directional helically wound fiber reinforcement 144, an inner flexible filler layer 145 and a inner permeation barrier layer 146 which has smooth inner surface.

Figure 22:
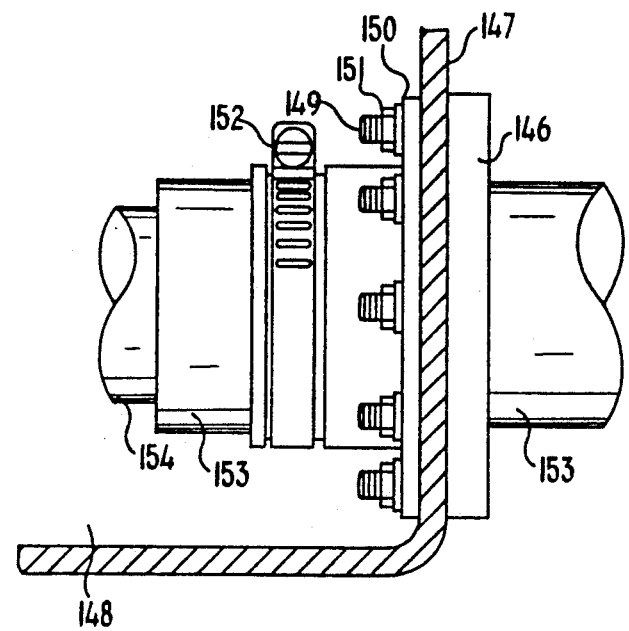
FIG. 22 is a sectional side view of an access chamber wall showing the installation and final assembly of a sealing device connected to the flexible coaxial primary supply and secondary containment piping.

FIG. 22 shows how the flexible entry seal 146 is installed into the flat side wall 147 of a access sump 148. A opening and numerous bolt holes are drilled into the lower flat side wall and the flexible entry seal and it's stud fasteners 151 are inserted through the opening and bolt holes. Once fully inserted, the metal compression ring 149 is installed over the protruding stud fasteners. Next the nut fasteners 150 are installed onto the stud fasteners and tightened. Next the metal band clamp 152 is then installed loosely over the opening of the flexible entry seal and the flexible coaxial piping 153 is inserted into the opening of the flexible entry seal from outside the access sump. Once inserted, the end of the flexible coaxial piping is sealed to the flexible entry boot by tightening the metal band clamp. Also shown is the inner multi-layer primary pipe section 154 extending beyond the end of the outer containment single layer pipe section.

Figure 23:
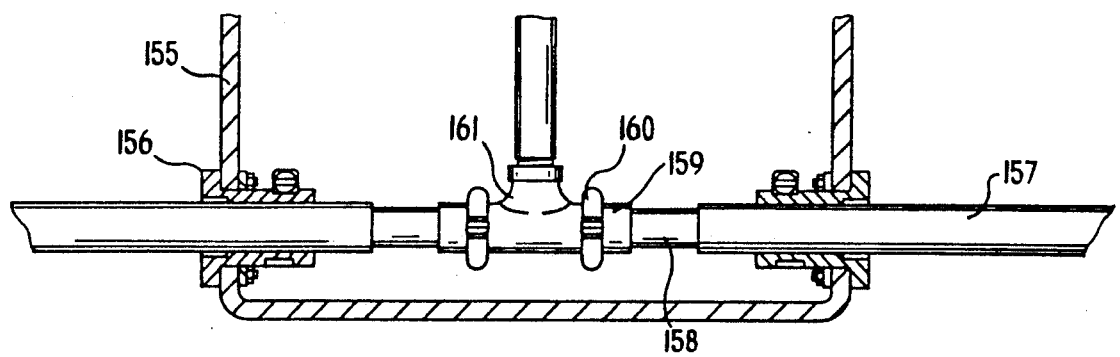
FIG. 23 is a sectional side view of an access chamber wall showing the installation and final assembly of a sealing device connected to the flexible coaxial primary supply and secondary containment piping.

FIG. 23 shows a typical flexible coaxial piping connection to the wall of the access chamber 155 by means of an installed flexible entry seal 156. The flexible coaxial pipings outer secondary containment and stand-off layer 157 is cut back away from the end of the inner flexible supply pipe 158 to allow sufficient length for installation of the supply pipe coupling device 159. The supply pipe coupling is connected and sealed to the supply pipe fitting 161 coupling by by means of a compression clamp 160.

Figure 24:
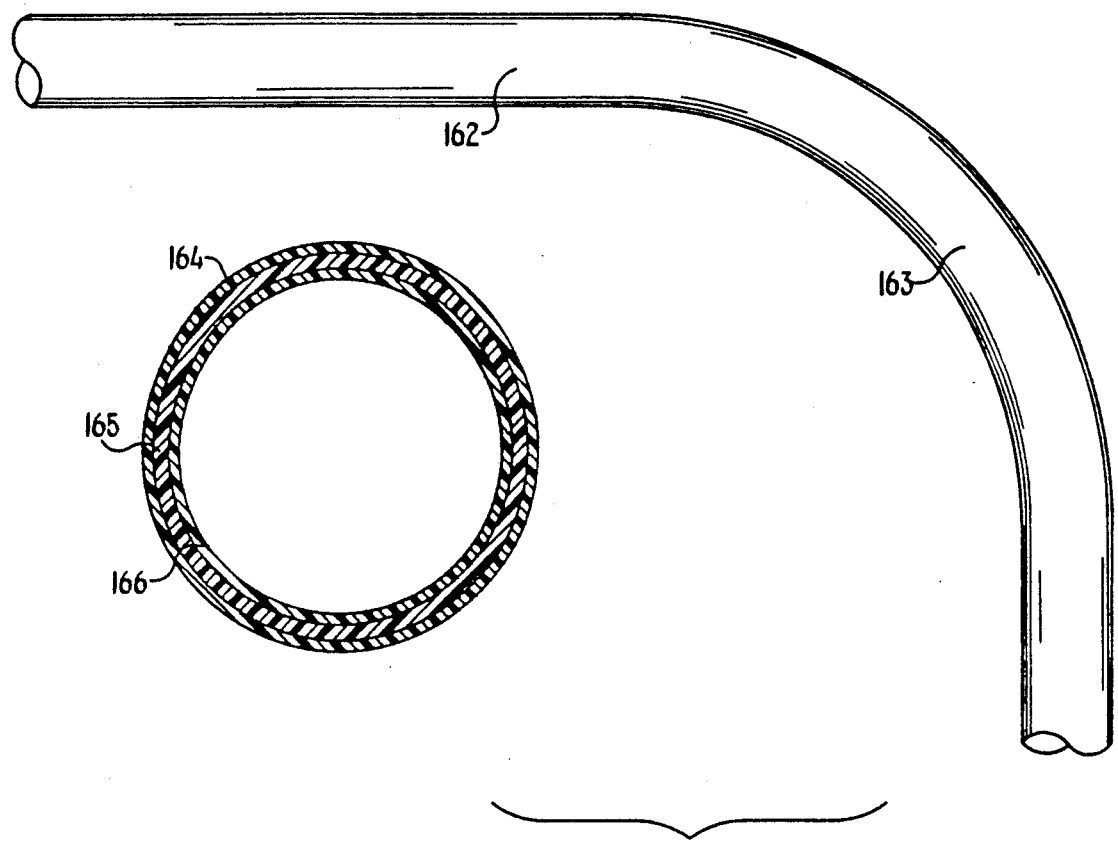
FIG. 24 is a side perspective view of the flexible single wall primary pipe showing its bend radius and a front end view showing its multi-layer construction.

FIG. 24 shows the flexibility of a section of the direct bury flexible single wall primary pipe 162 and its minimum installed bend radius 163. The typical installed bend radius should not be less than eight (6) times its diameter. The end of flexible single wall primary pipe section reveals a multilayer composite construction consisting of an outer damage protection layer 164 and inner flexible filler layer 165 and inner permeation barrier layer 166 which has smooth inner surface.

Figure 25:
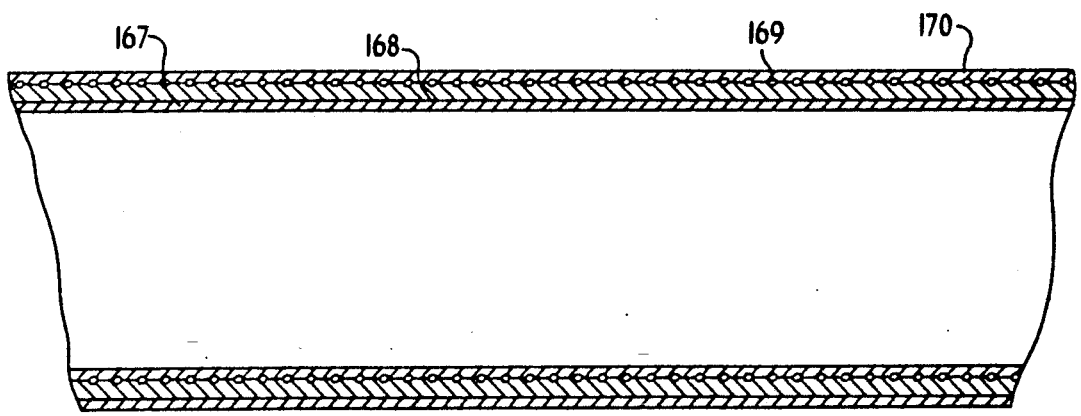
FIG. 25 is a side cross sectional view of the flexible single wall primary pipe showing its multi-layer construction.

FIG. 25 shows a cross sectional view of the direct bury flexible single wall primary pipe in more detail depicting damage protection layer 167, the inner flexible filler layer 168, a cross directional helically wound fiber reinforcement 169 and inner permeation barrier layer 170 which has smooth inner surface.

An important consideration of the invention, not previously mentioned, is that the non-flexible secondary containment piping, as shown in FIGS. 1-9, may be completely installed, integrity tested and backfilled to grade level prior fabricating and installing the primary supply piping system. This has significant installation advantages with respect to time considerations for weather conditions, rental or time use of excavation equipment, delivery scheduling of backfill materials and the removal of stored backfill piles from the site to permit other installation activities to proceed which would generally be required to wait until the entire double wall piping system is complete. The design of the secondary system is such that it provides sufficient room within a chamber to install a flexible supply pipe section, fitted on each end with a connection coupling, down through the chamber opening and into the opening of the non-flexible containment pipe. The non-flexible containment pipe sections are of sufficient size to accept the insertion of flexible supply pipe and directional containment couplings which have a predetermined and fixed bend radius of sufficient radius and size to permit the flexible supply pipe section to change direction without interference.

The coaxial double wall piping, shown in FIGS. 19-23, is installed even faster than than that of the double wall piping described in the previous paragraph, because both the inner primary and outer secondary are integral with each other and are installed at the same time.

Another consideration of the invention is that flexible supply pipe is made from composite thermal-plastic materials (nylon/plyurethane composite) which provides a fuel impermeable (less than one percent (1%) weight loss per foot over 280 days) wall construction. For example, it is very important to provide a flexible primary pipe which will reduce, or eliminate altogether, the transmission of aromatic vapors of gasoline and its chemical additives. Considering the circumstance that the flexible supply pipe is installed underground where these aromatic explosive vapors could collect and create a potentially explosive atmosphere inside of a secondary containment system, of which it is contained.

In addition, the flexible supply pipe of the invention has a significant number of other improvements over other flexible supply products, already on the market, which are contained by a flexible and continuous containment pipe system. Some of these improvements are disclosed as follows: (a) The flexible supply pipe of the invention, has both a smooth inner surface and smooth outer surface which provides an ideal wall profile for attaching a conventional, internally expandable, coupling device which has a history of proven leak free performance. (b) The flexible supply pipe of the invention has an inner surface which is smooth and made of a low-resistance material (shiny and slick) which provides a higher hydraulic performance rating which means more dispensing gallons of liquid per lineal foot of distance. (c) The flexible supply pipe of the invention has a continuously wound fiber reinforcement encapsulated within the outer smooth layer and inner smooth layer which provides a highly pressure capable (400 psi operating pressure) which reduces pipe kicking due to pressure surges and eliminates pipe expansion which can effect sensitive in-line leak detection systems. The two hard, semi-rigid and strong nylon layers also serve to provide additional pipe strength. (d) The flexible supply pipe of the invention, provides an outer surface which is made of a low resistance material (shiny and slick) in combination with a wall construction which provides only moderate amount of flexibility. This combination of features allows the flexible supply pipe to be inserted into the non-flexible containment pipe and pushed from one access chamber to the next without the need for lubrication or pulling assistance from the other end. Note: The non-flexible containment pipe is made of a very hard plastic material which provides a very low resistance (shiny and slick) smooth surface (non-corrugated) so at not to interfere with installation of the flexible primary pipe.

What is claimed:

1. A secondarily contained underground piping system which connects the dispensing pump of an underground storage tank to an above ground dispensing unit, comprising:
   a) a originating chamber installed around the dispensing pump located at the beginning of a piping line providing a means of surface access, secondary containment, leak collection and having at least one opening in one of its side walls for pipeline access;
   b) a terminating chamber installed under an above ground dispensing unit located at the end of a piping line, providing a means of surface access, secondary containment, leak collection and having at least one opening in one of its side walls for pipeline access;
   c) a non-flexible containment piping section which is non-continuous comprising two or more straight non-flexible pipe lengths joined together by couplings, having an inside diameter of sufficient size, and a directional bend radius of sufficient length to permit a flexible supply section to be inserted from one end to the other, said sections interconnecting one chamber to the next through the openings in the side wall of the chambers;
   d) a sealing device providing a means of sealing all pipe entry and exit openings in the side wall of the chambers, to the annular wall of the non-flexible containment pipe, whereby the joint is liquid tight and secure;
   e) an originating plumbing assembly, providing a means of fluid shut-off and pump and flexible supply pipe interface, which is connected to the dispensing pump contained in the originating chamber;
   f) a terminating plumbing assembly, providing an interface for the dispensing unit and a flexible supply pipe section, connected to the above ground dispensing unit by means of a safety valve in the terminating chamber; and
   g) a flexible supply pipe section having couplings installed on each end as a means of interconnecting one plumbing assembly to the next through a non-flexible containment pipe section.

2. A secondarily contained underground piping system as claimed in claim 1, wherein the containment system components may be installed, connected, integrity tested, inspected for leaks and then backfilled to grade, prior to installing any of the supply system components.

3. A secondarily contained underground piping system as claimed in claim 1, wherein all of the supply system components may be installed, connected, integrity tested, and inspected for leaks after the containment system has been installed and backfilled to grade.

4. A secondarily contained underground piping system as claimed in claim 1, wherein said non-flexible containment pipe sections have smooth inner and outer walls and are made of glass fiber reinforced thermo-set plastic material which are bonded together.

5. A secondarily contained underground piping system as claimed in claim 1, wherein said non-flexible containment pipe sections have smooth inner and outer walls and are made of a thermo-plastic material joined together by a nylon compression fitting with internal seals.

6. A secondarily contained underground piping system as claimed in claim 1, wherein said flexible supply pipe has smooth inner and outer surfaces and is made of fiber reinforced thermal plastic composite material.

7. A secondarily contained underground piping system as claimed in claim 1, wherein the flexible supply pipe couplings make a fluid tight connection to a plumbing assembly by means of two butt flanges compressing an O-ring by means of an annular clamshell clamp compressed together by fasteners.

8. A secondarily contained underground piping system as claimed in claim 1, wherein said interconnected chambers provide a system for collection and detection of fluids, which may originate from inside or outside the containment system.

9. A secondarily contained underground piping system as claimed in claim 1, wherein said chambers have means for surface access to all of the primary piping connections, containment piping connections, flexible seal connections and chamber connections.

10. A secondarily contained underground piping system as claimed in claim 1, including non-flexible containment pipe crossovers supported by a support conduit positioned under the crossover pipe.

11. A secondarily contained underground piping system claimed in claim 1, including:
   h) a junction chamber which is installed directly under an above ground dispensing unit located within the piping line which provides a means of surface access, secondary containment, leak collection and provides an opening in one of its side walls for a pipe entry and another opening in the opposite side wall for a pipe exit; and
   i) a junction plumbing assembly, which provides an interface for the dispensing unit and two flexible pipe sections, that is connected to the above ground dispensing unit, indirectly, by means of a safety valve, contained within a junction dispenser chamber.

12. A secondarily contained underground piping system which interconnects the dispensing pump of an underground storage to an above ground dispensing unit comprising:
   a) a originating chamber which is installed around the tank dispensing pump located at the beginning of a piping line, providing a means of surface access, secondary containment and leak collection;
   b) a terminating chamber installed under an above ground dispensing unit located at the end of a piping line providing a means of surface access, secondary containment and leak collection;
   c) a flexible double walled piping section consisting of an outer flexible secondary containment pipe integral with an inner flexible primary supply pipe which is fitted on each end with a coupling;
   d) a sealing device providing a means of mechanically sealing all pipe entry and exit openings in the side wall of the chambers, to the annular wall of the non-flexible containment pipe, whereby the joint is liquid tight and secure;
   e) an originating plumbing assembly providing a means of fluid shut-off and pump and flexible supply pipe interface, which is connected to the dispensing pump in the originating chamber; and
   f) a terminating plumbing assembly providing an interface for the dispensing unit and a flexible supply pipe section connected to the above ground dispensing unit indirectly by means of a safety valve, contained within the terminating chamber.

13. A secondarily contained underground piping system which interconnects the dispensing pump of an underground storage to an above ground dispensing unit comprising:
   a) a originating chamber which is installed around the tank dispensing pump located at the beginning of a piping line, providing a means of surface access, secondary containment and leak collection;
   b) a terminating chamber installed under an above ground dispensing unit located at the end of a piping line providing a means of surface access, secondary containment and leak collection;
   c) a flexible piping section consisting of an outer flexible secondary containment pipe integral with an inner flexible primary supply pipe which is fitted on each end with a coupling;
   d) a sealing device providing a means of mechanically sealing all pipe entry and exit openings in the side wall of the chambers, to the annular wall of the non-flexible containment pipe, whereby the joint is liquid tight and secure;
   e) an originating plumbing assembly providing an interface connecting to the dispensing pump in the originating chamber; and
   f) a terminating plumbing assembly providing an interface for the tank dispensing pump and flexible primary supply pipe section.

14. A secondarily contained underground piping system which interconnects the dispensing pump of an underground storage to an above ground dispensing unit comprising:
   a) a originating chamber which is installed around the tank dispensing pump located at the beginning of a piping line, providing a means of surface access, secondary containment and leak collection;
   b) a terminating chamber installed under an above ground dispensing unit located at the end of a piping line providing a means of surface access, secondary containment and leak collection;
   c) a flexible piping section consisting of an outer flexible secondary containment pipe integral with an inner flexible primary supply pipe which is fitted on each end with a coupling;
   d) a sealing device providing a means of mechanically sealing all pipe entry and exit openings in the side wall of the chambers, to the annular wall of the non-flexible containment pipe, whereby the joint is liquid tight and secure.

15. A secondarily contained underground piping system as claimed in claim 13, wherein the flexible supply piping couplings provide a fluid tight connection to a plumbing assembly by means of two butt flanges compressing an O-ring by means of an annular clamshell clamp compressed together by fasteners.

16. A secondarily contained underground piping system as claimed in claim 13, wherein all interconnected chambers provide means of collection for any fluid, which may originate from inside or outside the containment system, for purposes of detection.

17. A secondarily contained underground piping system claimed in claim 13, wherein all chambers permit physical surface access to all of the primary piping connections, containment piping connections, flexible seal connections and chamber connections.

18. A secondarily contained underground piping system as claimed in claim 13, wherein all pipe crossovers are supported by a support conduit installed around the lower pipe and positioned under the crossover pipe.

19. A secondarily contained underground piping system as claimed in claim 13, including:

g) a junction chamber installed under an above ground dispensing unit located within the piping line providing a means of surface access, secondary containment, leak collection and having openings in the side walls for pipe entry and pipe exit; and h) a junction plumbing assembly providing an interface for the dispensing unit and two flexible pipe sections connected to the above ground dispensing unit.

20. A non-secondarily contained underground piping system which interconnects the dispensing pump of an underground storage tank to an above ground terminating dispensing unit, comprising:

a) a originating chamber installed around the dispensing pump located at the beginning of a piping line, providing a means of surface access, secondary containment, leak collection and having openings in the side wall for piping;

b) a terminating chamber installed directly under an above ground dispensing unit located at the end of a piping line providing a means of surface access, secondary containment, leak collection and having an opening in the side walls for pipe entry;

c) a flexible supply pipe section which is not secondarily contained and is continuous having a coupling installed on each end;

d) a sealing device providing a means of mechanically sealing all pipe entry and exit openings located in the side wall of the chambers, to the annular wall of the non-flexible containment pipe, whereby the joint is liquid tight and secure;

e) a originating plumbing assembly providing a means of fluid shut-off and pump and flexible supply pipe interface connected to the dispensing pump; and f) a terminating plumbing assembly providing an interface for the dispensing unit and a flexible supply pipe section, connected to the above ground dispensing unit indirectly by means of a safety valve, contained within the terminating chamber.

21. A flexible non-secondarily contained underground piping system as claimed in claim 20, wherein the pipe couplings make a fluid tight connection to a plumbing assembly including two butt flanges compressing an O-ring seal by means of a annular clamshell clamp.

22. A flexible non-secondarily contained underground piping system as claimed in claim 20, wherein all the chambers provide means of secondary containment for all piping plumbing connections and collection of any leaking fluids for purposes of detection.

23. A flexible non-secondarily contained underground piping system as claimed in claim 20, wherein all the chambers permit physical surface access to all of the primary piping plumbing connections, flexible seal connections and chamber connections contained within.

24. A secondarily contained underground piping system as claimed in claim 20, wherein all piping crossovers are supported by a support conduit which is installed around the lower pipe and positioned under the crossover pipe.

25. A secondarily contained underground piping system as claimed in claimed 20, including:

g) a junction chamber which is installed under an above ground dispensing unit located within the piping line providing a means of surface access, secondary containment, leak collection and having openings in the side walls for pipe entry and pipe exit; and h) a junction plumbing assembly, which provides an interface for the dispensing unit and two flexible pipe sections, connected to the above ground dispensing unit.

26. A secondarily contained underground piping system which connects the dispensing pump of an underground storage tank to an above ground dispensing unit, comprising:

a) an originating chamber installed around the dispensing pump located at the beginning of a pipe line providing a means of surface access, secondary containment and leak collection;

b) a terminating chamber installed under an above ground dispensing unit located at the end of a pipe line providing a means of surface access, secondary containment and leak collection;

c) an outer containment piping section and flexible supply piping section interconnecting one chamber to the next through openings in the side wall of the chambers;

d) a sealing device, mechanically sealing pipe entry and exit openings located in the side wall of the chambers, to the containment pipe, whereby the joint is liquid tight and secure;

e) an originating plumbing assembly providing a means of fluid shut-off and pump and flexible supply pipe interface, connected to the dispensing pump contained within the originating chamber; and f) a terminating plumbing assembly providing an interface for the dispensing unit and flexible supply piping section connected to the above ground dispensing unit by means of a safety valve in the terminating chamber.

27. A secondarily contained underground piping system which connects the dispensing pump of an underground storage tank to an above ground dispensing unit, comprising:

a) an originating chamber installed around the dispensing pump located at the beginning of a pipe line;

b) a terminating chamber installed under an above ground dispensing unit located at the end of a pipe line;

c) an outer containment piping section and flexible supply piping section interconnecting one chamber to the next through openings in the side wall of the chambers;

d) a sealing device, mechanically sealing pipe entry and exit openings located in the side wall of the chambers, to the containment pipe, whereby the joint is liquid tight and secure;

e) an originating plumbing assembly providing a means of fluid shut-off connected to the dispensing pump; and f) a terminating plumbing assembly providing an interface for the dispensing unit and flexible supply piping section connected to the above ground dispensing unit by means of a safety valve in the terminating chamber.

28. A secondarily contained underground piping system which connects the dispensing pump of an underground storage tank to an above ground dispensing unit, comprising;

a) a originating chamber installed around the dispensing pump located at the beginning of a piping line, providing a means of surface access, secondary containment, leak collection and having at least one opening in one of its side walls for pipe;

b) a terminating chamber installed under an above ground dispensing unit located at the end of a piping line, providing a means of surface areas, secondary containment, leak collection and having at least one opening in one of its side walls for pipe;

c) a non-flexible containment piping section which is non-continuous comprising of two or more straight non-flexible pipe lengths joined together by couplings, having an inside diameter of sufficient size, and a directional bend radius of sufficient length to permit a flexible supply section to be inserted from one end to the other, said section interconnecting one chamber to the next chamber through the openings in the side wall of the chambers;

d) a sealing device providing a means of sealing all pipe entry and exit openings in the side wall of the chambers, to the annular wall of the non-flexible containment pipe, whereby the joint is liquid tight and secure; and e) an originating plumbing assembly, providing a means of fluid shut-off and pump and flexible supply pipe interface, which is connected to the tank dispensing pump contained within the originating chamber.

29. A secondarily contained underground piping system for connecting the elements of the system including a dispensing pipe of an underground storage tank to an above ground dispensing unit, comprising:

a) at least one chamber installed around at least one of the elements of the system; and b) a flexible piping connecting the elements consisting of an inner pipe member, an outer pipe member circumscribing the inner piper member, a plurality of circumferentially spaced ribs extending radially from one of said pipe members having a surface confronting and snugly engaging the other pipe member and defining a plurality of interstitial spaces between the pipe members; and the confronting surfaces of said ribs having a predetermined configuration in a longitudinal direction to permit migration of a fluid in said interstitial spaces in all directions.

30. A secondarily contained underground piping system for connecting the elements of the system including a dispensing pipe of an underground storage tank to an above ground dispensing unit, comprising:

a) at least one chamber installed around at least one of the elements of the system; and b) a flexible piping connecting the elements consisting of an inner and a outer pipe whereby the inside surface of the outer pipe has a plurality of internally facing longitudinal ribs in radial communication with the outside surface of the inner pipe in such a manner that a small interstitial space between both walls is created to permit fluid and gas migration from on end of the pipe section to the other.

31. A secondarily contained underground piping system for connecting the elements of the system including a dispensing pipe of an underground storage tank to an above ground dispensing unit, comprising:

a) at least one chamber installed around at least one of the elements of the system; and b) a flexible piping connecting the elements consisting of an inner pipe contained by an outer pipe is in radial communication with the outside surface of the inner pipe in such a manner that a small interstitial space between both walls is created to permit fluid and gas migration in both a radial and longitudinal directions even under outside pressures created from underground burial conditions.

32. A secondarily contained underground piping system for connecting the elements of the system including a dispensing pipe of an underground storage tank to an above ground dispensing unit, comprising:

a) at least one chamber installed around at least one of the elements of the system; and b) a flexible piping connecting the elements consisting of an inner pipe and a outer pipe is in radial communication with the outside surface of the inner pipe in such a manner that a small interstitial space between both walls is created to permit fluid and gas migration from one end of the pipe section to the other.

* * * * *

UNITED STATES PATENT AND TRADEMARK OFFICE
CERTIFICATE OF CORRECTION

PATENT NO. : B1 5,297,896
DATED : January 30, 1996
INVENTOR(S) : Michael C. Webb It is certified that error appears in the above-indentified patent and that said Letters Patent is hereby corrected as shown below:

On title page item [45], should read:

[*]   The portion of the term of this patent subsequent to February 19, 2012 has been disclaimed.

Signed and Sealed this

Sixteenth Day of September, 1997

Attest:

BRUCE LEHMAN

Attesting Officer          Commissioner of Patents and Trademarks

REEXAMINATION CERTIFICATE (2791th)

United States Patent [19]
Webb

[11] B1 5,297,896
[45] Certificate Issued Jan. 30, 1996

[54] ENVIRONMENTALLY SAFE UNDERGROUND PIPING SYSTEM

[75] Inventor: Michael C. Webb, Chester Springs, Pa.

[73] Assignee: Environ Products, Inc., Lionville, Pa.

Reexamination Request:
No. 90/003,767, Mar. 24, 1995

Reexamination Certificate for:
Patent No.: 5,297,896
Issued: Mar. 29, 1994
Appl. No.: 857,361
Filed: Mar. 25, 1992

Related U.S. Application Data

[63] Continuation-in-part of Ser. No. 838,615, Feb. 19, 1992, abandoned.

[51] Int. Cl.⁶ .................................................. F16L 1/00
[52] U.S. Cl. .................. 405/52; 73/40.5 R; 138/114; 405/154; 588/249; 588/260
[58] Field of Search ..................... 138/111–114, 140, 138/141, 144; 73/40.5 R

[56] References Cited
PUBLICATIONS

Enviroflex Brochure, The flexible double–wall piping system Sep. 1990.

*Primary Examiner*—Dennis L. Taylor

[57] ABSTRACT

An environmentally safe underground piping system for liquid fuels and chemicals which interconnects an underground liquid storage tank to one or more above ground liquid dispensing units, that provides a complete secondary containment system for the entire primary liquid supply piping system. The piping systems employs one tank access chamber interconnected to one or more dispenser access chambers by a double walled pipe. The double wall pipe provides an interstitial space for gravity flow of any leaking liquids, from any point in the primary liquid supply piping system, to an access chamber, which also serves as a liquid collection sump, for purposes of leak detection.

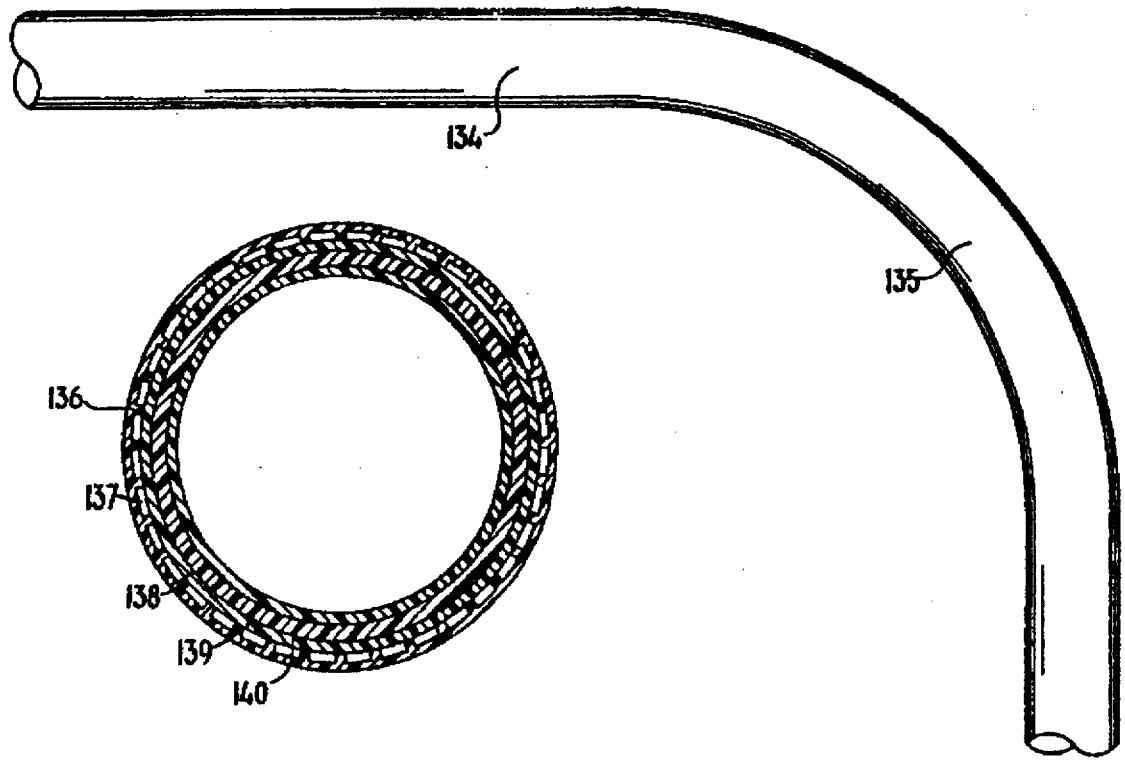

B1 5,297,896

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 15, lines 56–58:

FIG. 20 shows the flexibility of a section of the direct bury flexible coaxial piping 134 and its minimum installed bend radius 135. The typical installed bend radius should not be less than eight ([6]8) times its diameter. The end of *the* flexible single wall primary pipe section reveals a multilayer composite construction consisting of an outer damage protection and stand-off layer 136 consisting of a multitude of separator legs for creating an annular or interstitial space 137 for fluid migration, another damage protection and permeation barrier layer 138, an inner flexible filler layer 139 and a inner permeation barrier layer 140 which has *a* smooth inner surface.

Column 16, lines 1–10:

FIG. 21 shows a cross sectional view of the direct bury flexible coaxial piping in more detail depicting the outer damage protection and[] stand-off layer [141] *145* consisting of a multitude of separator legs for creating an annular or interstitial space [142] *144* for fluid migration, another damage protection and permeation barrier layer [143] *243*, a cross directional helically wound fiber reinforcement [144] *143*, an inner flexible filler layer [145] *142* and a inner permeation barrier layer [146] *141* which has *a* smooth inner surface.

Column 16, lines 39–53:

FIG. 24 shows the flexibility of a section of the direct bury flexible single wall primary pipe 162 and its minimum installed bend radius 163. The typical installed bend radius should not be less than eight ([6]8) times its diameter. The end of *the* flexible single wall primary pipe section reveals a multilayer composite construction consisting of an outer damage protection layer 164 and inner flexible filler layer 165 and inner permeation barrier layer 166 which has *a* smooth inner surface.

FIG. 25 shows a cross sectional view of the direct bury flexible single wall primary pipe in more detail depicting *the* damage protection layer [167] *170*, the inner flexible filler layer 168, a cross directional helically wound fiber reinforcement 169 and inner permeation barrier layer [170] *167* which has *a* smooth inner surface.

The drawing figure(s) have been changed as follows: reference numeral 243 added to FIG. 21.

AS A RESULT OF REEXAMINATION, IT HAS BEEN DETERMINED THAT:

The patentability of claims 1–29, and 31 is confirmed.

Claims 30 and 32 are cancelled.

New claims 33–47 are added and determined to be patentable.

*33. A secondarily contained underground piping system for connecting the elements of the system including a dispensing pipe of an underground storage tank to an above ground dispensing unit, comprising:*

*at least one chamber installed around at least one of the elements of the system; and*

*flexible coaxial piping connecting the elements, said flexible coaxial piping consisting of an inner flexible primary pipe and a separate flexible damage protection and standoff pipe for secondary containment, each of said primary pipe and standoff pipe having an inner and an outer surface respectively, and*

*a multitude of separator legs extending radially inward from the inner surface of said standoff pipe and contacting the outer surface of the primary pipe, said separator legs creating an interstitial space for fluid migration in all directions between the primary and standoff pipes;*

*said primary pipe comprising a plurality of layers including an inner barrier layer and an outer protection layer.*

*34. The secondarily contained underground piping system of claim 33, wherein the primary pipe further comprises a fiber reinforcement layer.*

*35. The secondarily contained underground piping system of claim 33, wherein the primary pipe further comprises a flexible filler layer.*

*36. A secondarily contained underground piping system for connecting the elements of the system including a dispensing pipe of an underground storage tank to an above ground dispensing unit, comprising:*

*at least one chamber installed around at least one of the elements of the system; and*

*flexible coaxial piping connecting the elements, said flexible coaxial piping consisting of an inner flexible primary pipe and a separate flexible damage protection and standoff pipe for secondary containment, each of said primary pipe and standoff pipe having an inner and an outer surface respectively, and*

*a multitude of separator legs extending radially inward from the inner surface of said standoff pipe and contacting the outer surface of the primary pipe, said separator legs creating an interstitial space for fluid migration in both radial and longitudinal directions between the primary and standoff pipes;*

*said primary pipe comprising a plurality of layers including an inner barrier layer and an outer protection layer.*

*37. The secondarily contained underground piping system of claim 36, wherein the primary pipe further comprises a fiber reinforcement layer.*

*38. The secondarily contained underground piping system of claim 36, wherein the primary pipe further comprises a flexible filler layer.*

*39. A secondarily contained underground piping system for connecting the elements of the system including a* dispensing pipe of an underground storage tank to an above ground dispensing unit, comprising:

at least one chamber installed around at least one of the elements of the system; and flexible coaxial piping connecting the elements, said flexible coaxial piping consisting of an inner flexible primary pipe and a separate flexible damage protection and standoff pipe for secondary containment, each of said primary pipe and standoff pipe having an inner and an outer surface respectively, and one of said primary pipe and standoff pipe having a multitude of separator legs extending radially toward and contacting the adjacent surface of the other of the primary pipe or standoff pipe, said separator legs creating an interstitial space for fluid migration in all directions between the primary and standoff pipes;

said primary pipe comprising a plurality of layers including an inner barrier layer and an outer protection layer.

40. The secondarily contained underground piping system of claim 39, wherein the primary pipe further comprises a fiber reinforcement layer.

41. The secondarily contained underground piping system of claim 39, wherein the primary pipe further comprises a flexible filler layer.

42. A secondarily contained underground piping system for connecting the elements of the system including a dispensing pipe of an underground storage tank to an above ground dispensing unit, comprising:

at least one chamber installed around at least one of the elements of the system; and flexible coaxial piping connecting the elements, said flexible coaxial piping consisting of an inner flexible primary pipe and a separate flexible damage protection and standoff pipe for secondary containment, each of said primary pipe and standoff pipe having an inner and an outer surface respectively, and a multitude of separator legs extending radially inward from the inner surface of said standoff pipe and contacting the outer surface of the primary pipe, said separator legs creating an interstitial space for fluid and gas migration through the coaxial pipe from one end to the other within the interstitial space;

said primary pipe comprising a plurality of layers including an inner barrier layer and an outer protection layer.

43. The secondarily contained underground piping system of claim 42, wherein the primary pipe further comprises a fiber reinforcement layer.

44. The secondarily contained underground piping system of claim 42, wherein the primary pipe further comprises a flexible filler layer.

45. A secondarily contained underground piping system for connecting the elements of the system including a dispensing pipe of an underground storage tank to an above ground dispensing unit, comprising:

at least one chamber installed around at least one of the elements of the system; and flexible coaxial piping connecting the elements, said flexible coaxial piping consisting of an inner flexible primary pipe and a separate flexible damage protection and standoff pipe for secondary containment, each of said primary pipe and standoff pipe having an inner and an outer surface respectively, and one of said primary pipe and standoff pipe having a multitude of separator legs extending radially toward and contacting the adjacent surface of the other of the primary pipe or standoff pipe, said separator legs creating an interstitial space for fluid and gas migration through the coaxial pipe from one end to the other within the interstitial space;

said primary pipe comprising a plurality of layers including an inner barrier layer and an outer protection layer.

46. The secondarily contained underground piping system of claim 45, wherein the primary pipe further comprises a fiber reinforcement layer.

47. The secondarily contained underground piping system of claim 45, wherein the primary pipe further comprises a flexible filler layer.

* * * * *